AUTOMATIC TOLL TICKETING TELEPHONE SYSTEM

Filed June 27, 1957 16 Sheets-Sheet 1

INVENTORS.
IVAN V. COLEMAN
JACK W. TAUGNER
BY C. R. Sipe
ATTY.

AUTOMATIC TOLL TICKETING TELEPHONE SYSTEM

INVENTORS,
IVAN V. COLEMAN
JACK W. TAUGNER
BY C. R. Sipe
ATTY.

July 28, 1959 I. V. COLEMAN ET AL 2,897,273

AUTOMATIC TOLL TICKETING TELEPHONE SYSTEM

Filed June 27, 1957 16 Sheets-Sheet 3

INVENTORS
IVAN V. COLEMAN
JACK W. TAUGNER
BY C. R. Sipe
ATTY.

INVENTORS
IVAN V. COLEMAN
JACK W. TAUGNER
BY C. R. Sipe
ATTY.

INVENTORS
IVAN V. COLEMAN
JACK W. TAUGNER
BY C. R. Sipe
ATTY.

July 28, 1959 I. V. COLEMAN ET AL 2,897,273

AUTOMATIC TOLL TICKETING TELEPHONE SYSTEM

Filed June 27, 1957 16 Sheets-Sheet 6

INVENTORS
IVAN V. COLEMAN
JACK W. TAUGNER
BY C. R. Sipe
ATTY.

INVENTORS.
IVAN V. COLEMAN
JACK W. TAUGNER
BY C. R. Sipe
ATTY.

July 28, 1959 I. V. COLEMAN ET AL 2,897,273

AUTOMATIC TOLL TICKETING TELEPHONE SYSTEM

Filed June 27, 1957 16 Sheets-Sheet 8

INVENTORS.
IVAN V. COLEMAN
JACK W. TAUGNER

BY C. R. Sipe

ATTY.

INVENTORS.
IVAN V. COLEMAN
JACK W. TAUGNER
BY C. R. Sipe
ATTY.

July 28, 1959 I. V. COLEMAN ET AL 2,897,273

AUTOMATIC TOLL TICKETING TELEPHONE SYSTEM

Filed June 27, 1957 16 Sheets-Sheet 10

INVENTORS.
IVAN V. COLEMAN
JACK W. TAUGNER
BY C. R. Sipe
ATTY.

July 28, 1959 I. V. COLEMAN ET AL 2,897,273

AUTOMATIC TOLL TICKETING TELEPHONE SYSTEM

Filed June 27, 1957 16 Sheets-Sheet 11

INVENTORS.
IVAN V. COLEMAN
JACK W. TAUGNER
BY C. R. Sipe
ATTY

AUTOMATIC TOLL TICKETING TELEPHONE SYSTEM

Filed June 27, 1957

INVENTORS.
IVAN V. COLEMAN
JACK W. TAUGNER
BY C. R. Sipe
ATTY.

July 28, 1959 I. V. COLEMAN ET AL 2,897,273

AUTOMATIC TOLL TICKETING TELEPHONE SYSTEM

Filed June 27, 1957 16 Sheets-Sheet 13

INVENTORS.
IVAN V. COLEMAN
JACK W. TAUGNER
BY C. R. Sipe
ATTY.

INVENTORS.
IVAN V. COLEMAN
JACK W. TAUGNER
BY C. R. Sipe
ATTY.

July 28, 1959 I. V. COLEMAN ET AL 2,897,273

AUTOMATIC TOLL TICKETING TELEPHONE SYSTEM

Filed June 27, 1957 16 Sheets-Sheet 15

INVENTORS.
IVAN V. COLEMAN
JACK W. TAUGNER
BY C. R. Sipe
ATTY.

INVENTORS.
IVAN V. COLEMAN
JACK W. TAUGNER
BY C. R. Sipe
ATTY.

Patented July 28, 1959

2,897,273

AUTOMATIC TOLL TICKETING TELEPHONE SYSTEM

Ivan V. Coleman, Naperville, and Jack W. Taugner, Park Ridge, Ill., assignors to General Telephone Laboratories, Incorporated, Chicago, Ill., a corporation of Delaware Application June 27, 1957, Serial No. 668,534

12 Claims. (Cl. 179—7.1)

Figure 1:
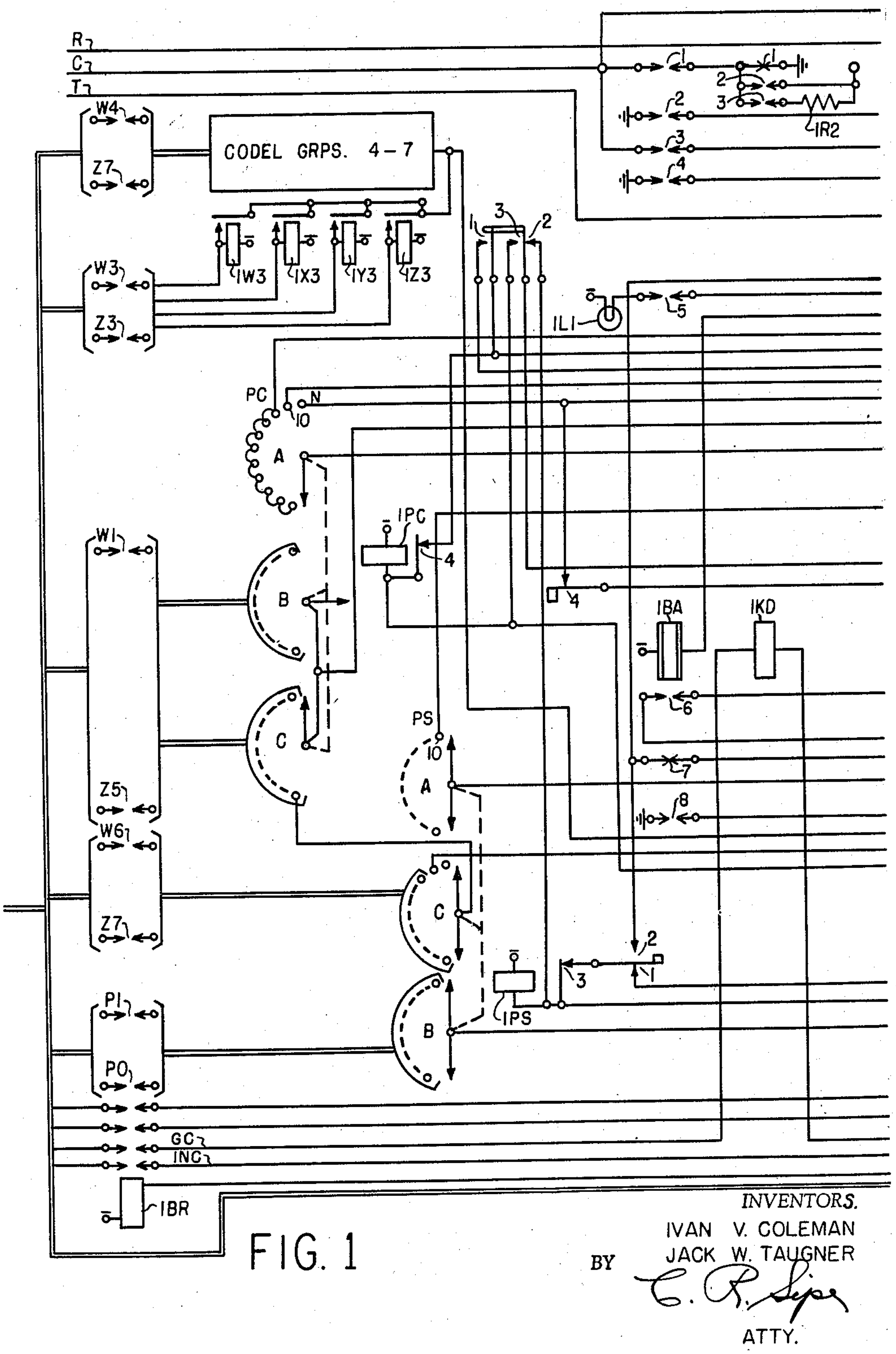
Figure 2:
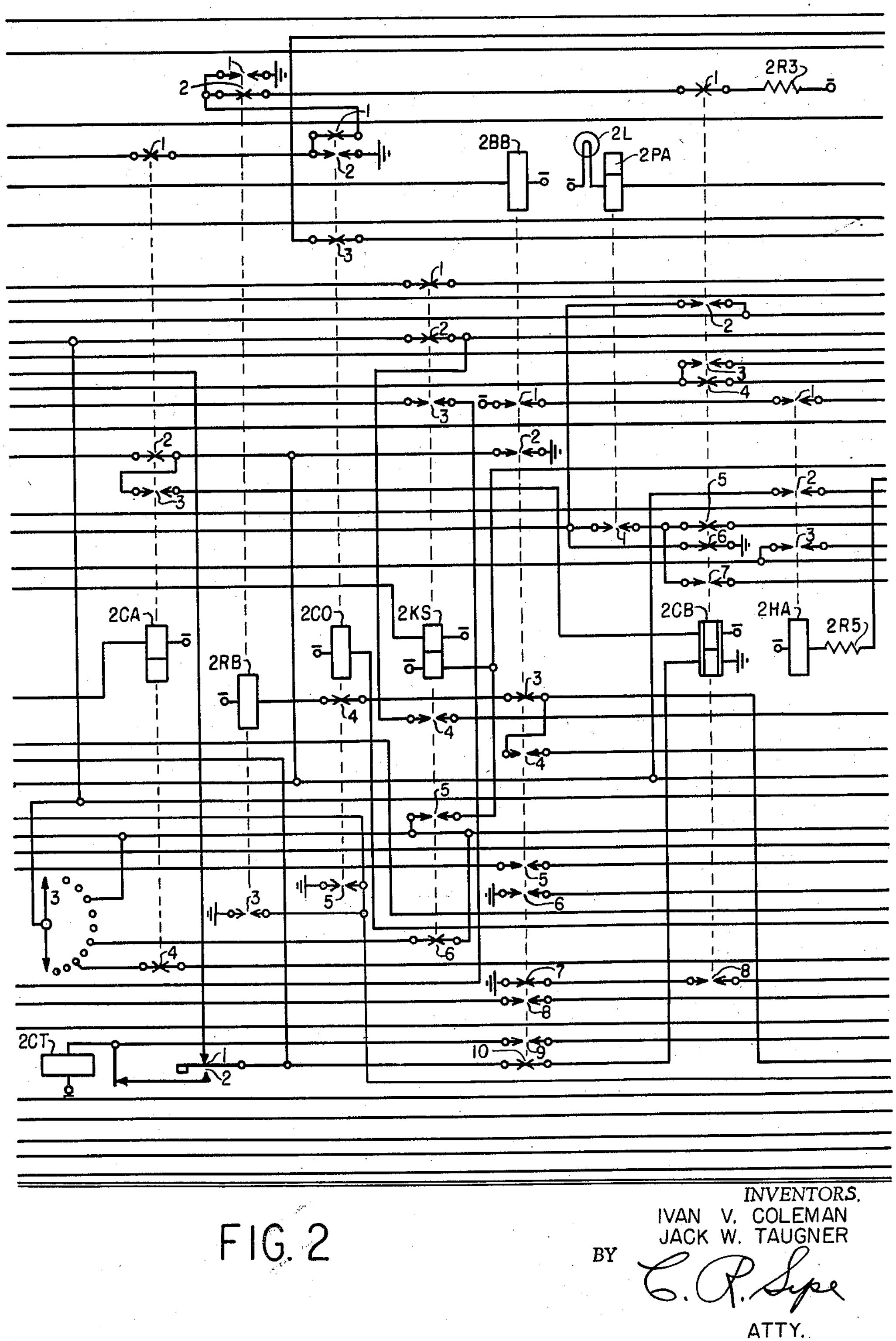
Figure 3:
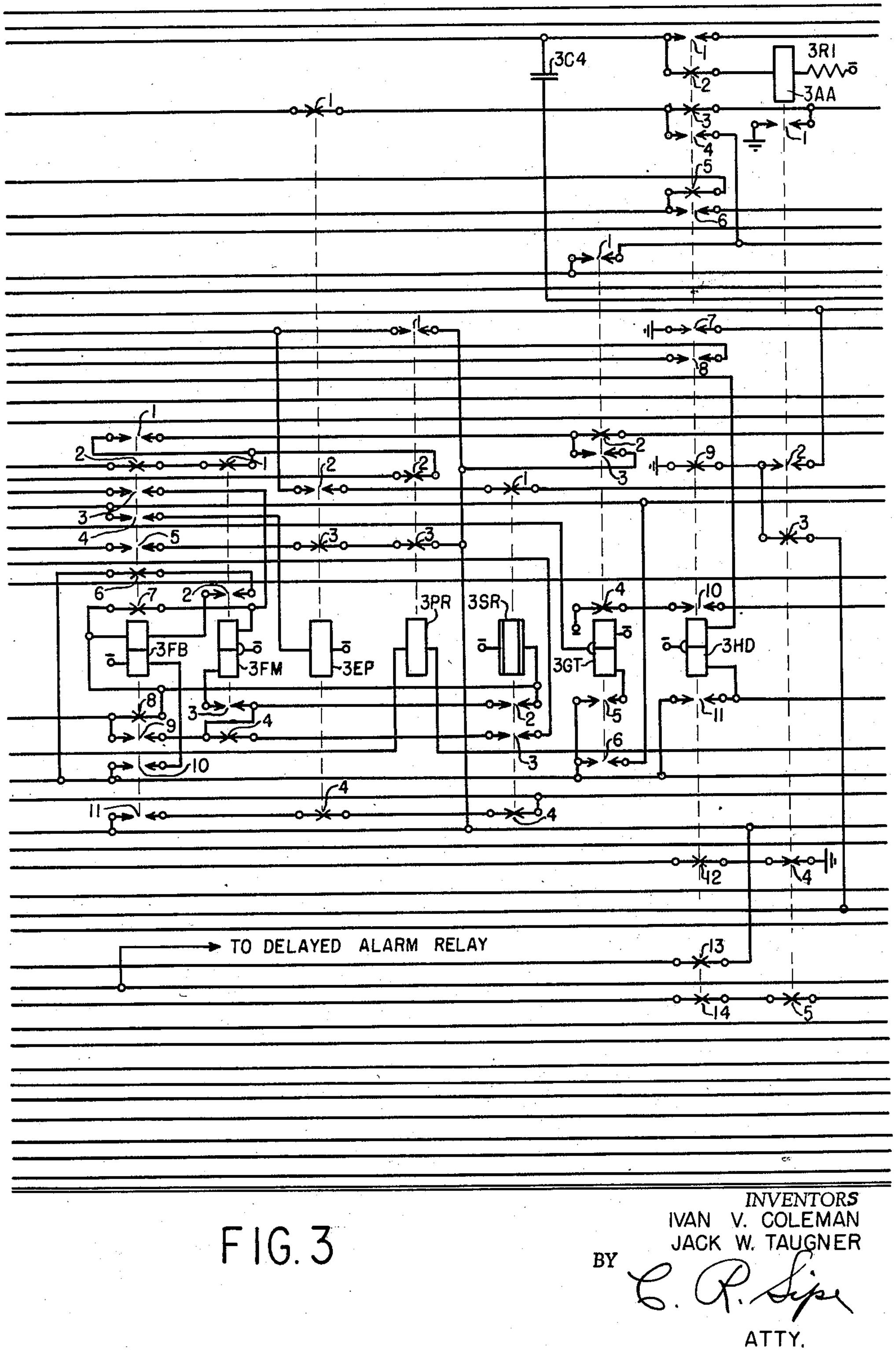
Figure 4:
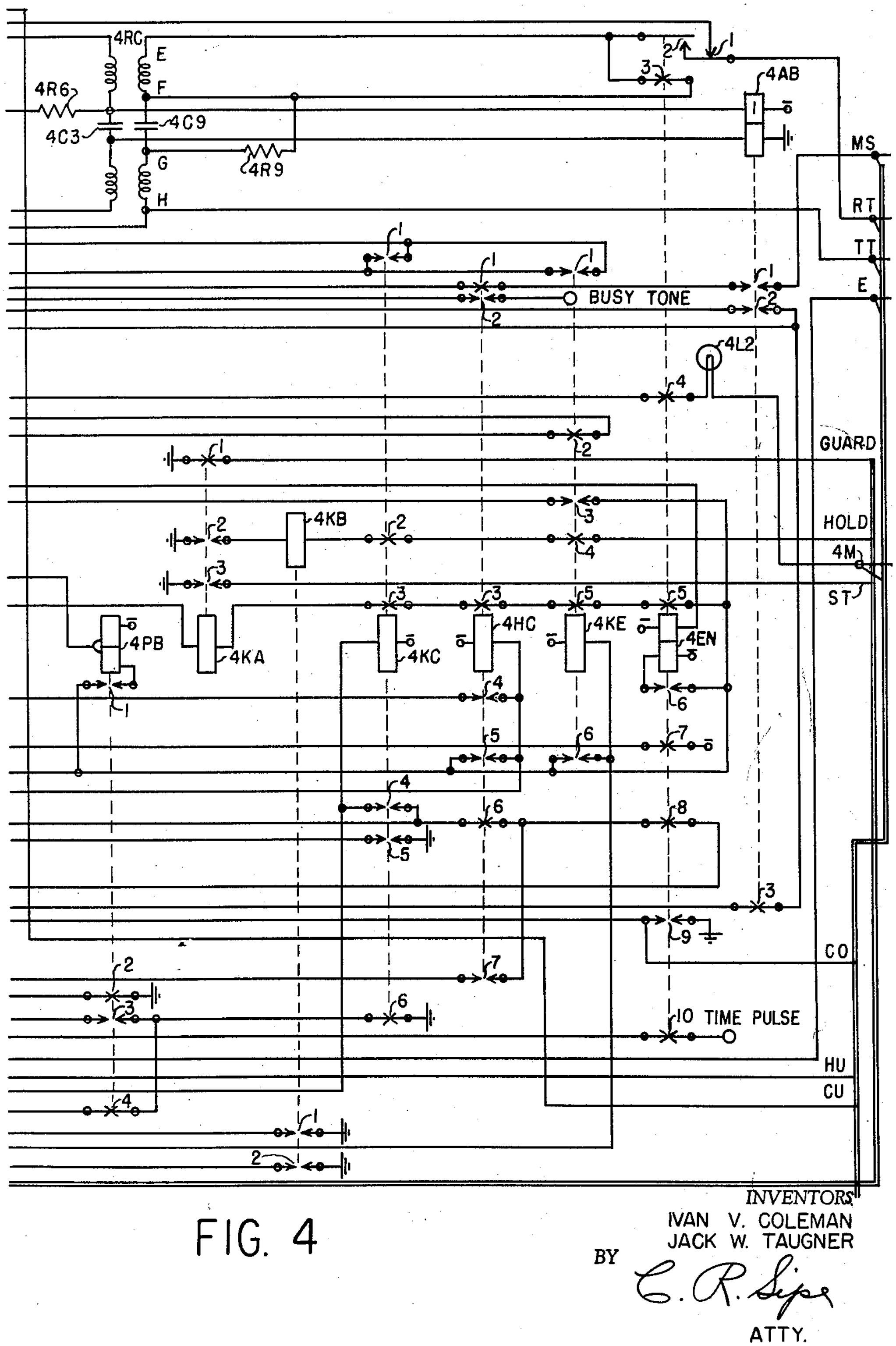

The present invention relates in general to multi-office automatic toll ticketing telephone systems with centrally located ticketing equipment arranged to produce an individual record of certain items of information pertaining to each toll telephone connection so that an appropriate charge may be assessed against the calling subscriber, and more particularly to improvements in the trunk circuits between offices of the system.

In prior automatic toll ticketing telephone networks of the type disclosed in the Ostline, Coleman and Taugner patent application, Serial No. 628,474, toll ticketing telephone connections are established under the control of common equipment accessed by a code dialled into the local switch train by the calling subscriber. The common equipment usually includes a toll ticket repeater, a calling line directory number detector, a translator-sender circuit to insure that the digits are properly dialled into the succeeding exchange and a tabulator with its associated daters and ticket perforators to compile the data relating to the call and make a record of it. This type of ticketing equipment has met with great success when used in offices of moderate size. To further increase the economies offered by systems of this general type, the equipment has been improved so that the advantages of toll ticketing may be extended to other exchanges in a network without entailing the duplication of all of the equipment. This is performed by using only a detector and a simplified trunk repeater in each branch exchange of a network having access to the centralized ticketing equipment. This improved dual type ticketer, installed in a main office, is used for the processing of subscriber dialled toll calls from that office as well as from stations served by the branch offices. This eliminates the need for ticketing repeaters, translator-senders and tabulators with their associated equipment in each satellite branch office, and concentrates the record of calls from such offices at a central point. The toll ticketer for this type of service is disclosed in the Ostline and Taugner patent application, Serial No. 650,508, filed April 3, 1957.

Full automatic identification of calling station numbers in both main and branch offices and the recording of such numbers in the main exchange are provided.

Automatic toll ticketing apparatus of the type noted above is particularly useful in moderate sized exchanges in the vicinity of 10,000 stations or smaller and in areas where there are a number of urban centers of comparable size. Occasionally, due to the difficulties presented by the intervening terrain, it may be uneconomical to install physical trunk lines between all of the interconnecting branch exchanges or even to install physical lines, in which case carrier channels or radio links or a combination of the two must be resorted to. These forms of communication channels however present additional problems for use with toll ticketing equipment since they are unidirectional and a multiplicity of control functions must be performed in each direction, thus requiring a large number of control channels. In the trunk repeater as disclosed in the Ostline and Taugner application, Serial No. 650,508 the signalling between the branch exchange repeater and the ticketing office is on a bi-directional basis. The subscriber's station identification number is forwarded from the branch exchange repeater to the ticketing office and the ticketing office register equipment is synchronized by sequencing pulses also originating in the branch exchange but the supervisory signals originate in the ticketing office. In addition the called station's directory number is forwarded from the branch exchange to the ticketing office. This amounts to a requirement for four signal channels besides the speech channel. Normally carrier or radio equipment for use on telephone circuits is arranged to provide a speech channel in each direction and signal channel in each direction which is commonly referred to as E and M signalling. To utilize the previously disclosed toll ticketing trunk equipment would require the use of two additional signalling channels beyond what is normally available with each speech channel on carrier equipment. If these requirements in the signalling channels could be decreased economies could be effected. In the disclosure in the present application it has been possible to decrease the requirements for the signal channels by having the sequencing control pulses originate in the ticketing office instead of in the branch exchange. This has been made possible by the combining of the sequencing pulses and the supervisory signalling to a single channel thus decreasing the signal channels required to only three.

In some instances it may be found desirable to group the trunks from some branch exchanges in tandem, again presenting new problems especially so if the trunks from the branch exchange are physical but are tandem from the intermediate exchange to carrier or radio links to the ticketing office. This requires a means for completing the bi-directional signalling channels of conventional trunks to uni-directional signals for use on the carrier or radio links at the tandem office. The equipment of this invention discloses means for accomplishing these desired results and providing for direct dialling between the offices of the network and including the inherent economies of automatic ticketing operation from the branch offices that provide such services.

Accordingly, it is the main object of the present invention to provide an automatic toll ticketing telephone system for use in relatively small exchanges, which is economical to manufacture and install and provides the necessary facilities for producing a permanent record of each toll connection.

It is a general object of the invention to provide an intertoll dialling system involving a network of automatic exchanges and offices, provided with subscriber substations, and automatic dial switchboards, whereby the usual trunk and toll connections may be set up and supervised employing the carrier links.

Another object of the invention is to provide in a telephone system including a remote exchange of the automatic type, a tandem exchange of the automatic type, and a main office provided with an automatic switchboard and automatic toll ticketing equipment, an improved arrangement for setting up connections involving the stations in the branch exchanges and the switchboard and automatic toll ticketing equipment in the main office.

Another object of the invention is to provide in a telephone system including two offices interconnected by a toll link, an improved arrangement for setting up a connection from a first switchboard in one of the offices to a second switchboard in the other of the offices via the carrier link, wherein all of the different supervisory signals are transmitted over the carrier link between the two switchboards that are necessary to facilitate the handling of toll traffic.

It is still another object of the invention to provide impulse repeaters in branch exchanges and the main exchange for forwarding to the toll ticketing repeaters the identity of the calling branch exchange subscriber while he is still dialling the called station's directory number.

A further object of the invention is to provide an impulse repeater for use with carrier or radio links between the branch exchange and the ticketing office.

Further objects and features of the present invention pertain to the particular arrangement of the various circuit elements of the automatic toll ticketing telephone system, whereby the above objects and additional operating features are attained.

Figure 5:
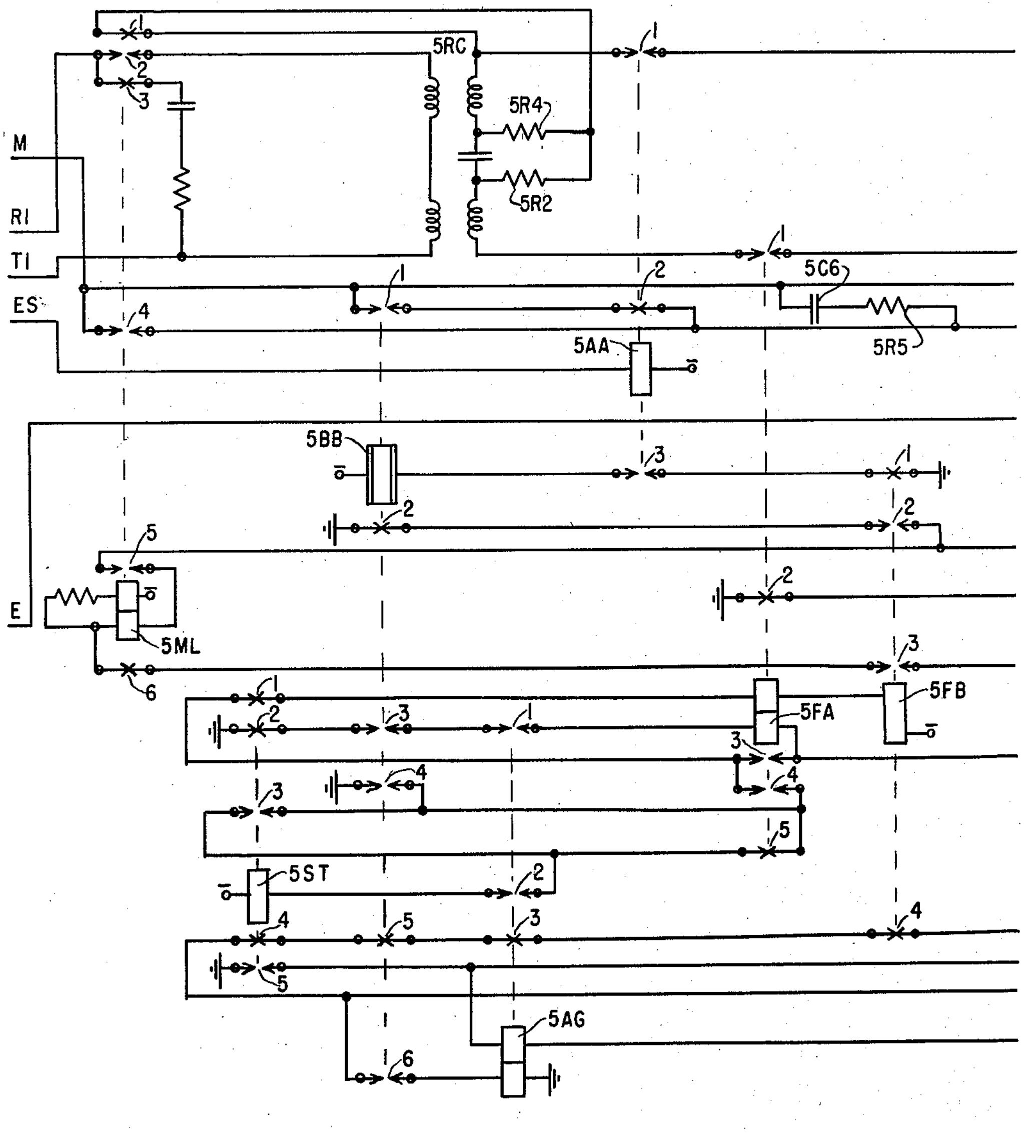
Figure 6:
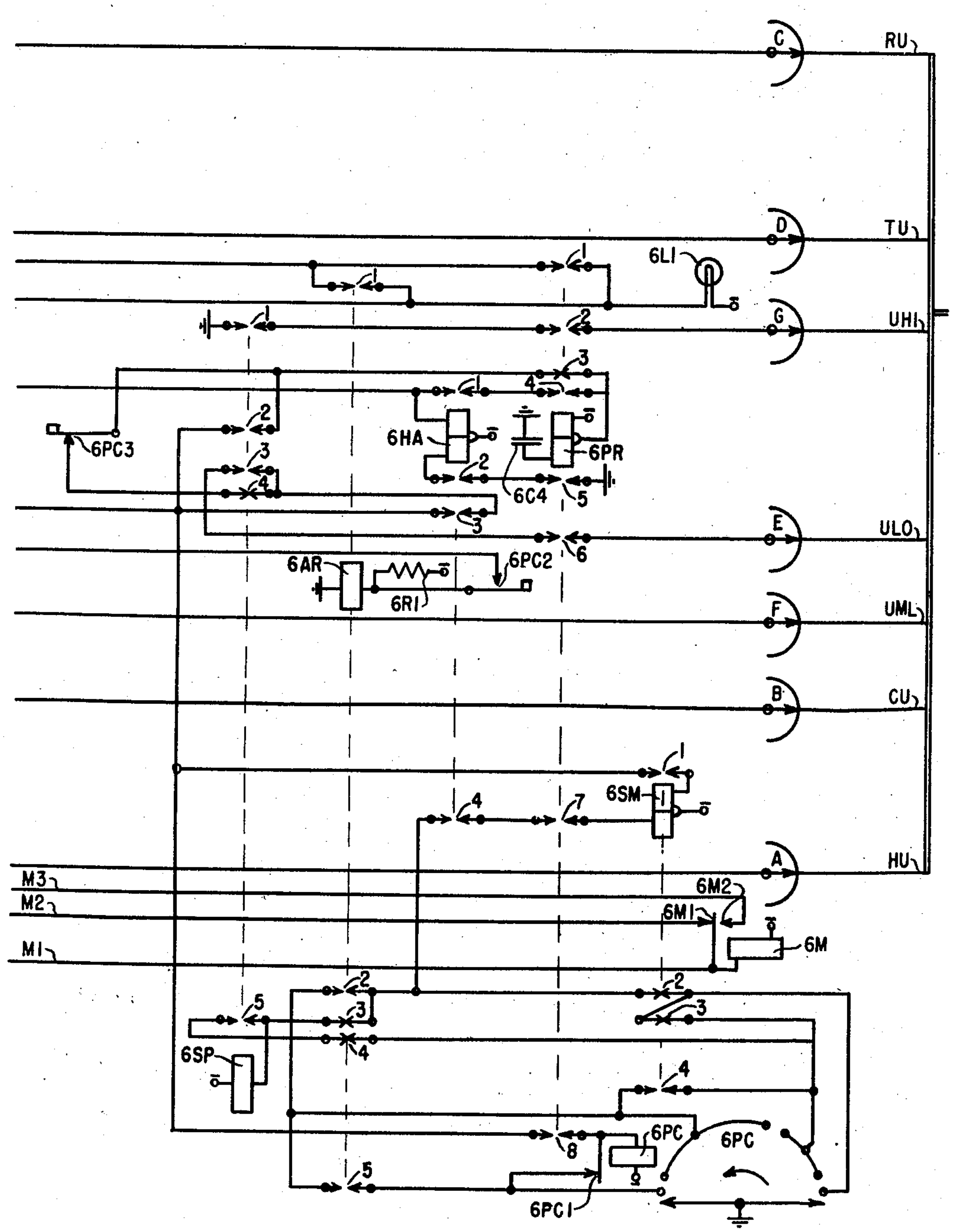
Figures 7, 17:
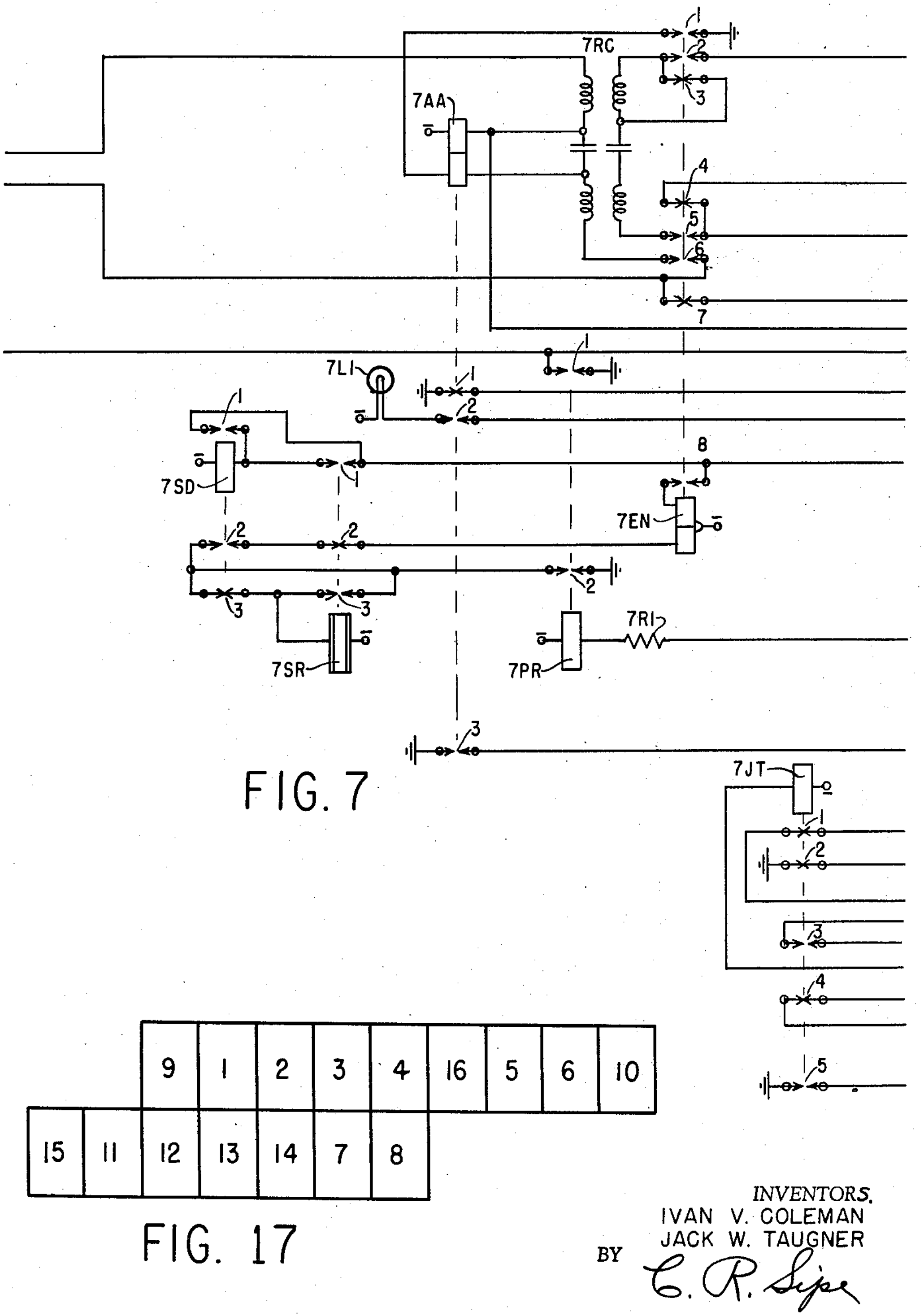
Figure 8:
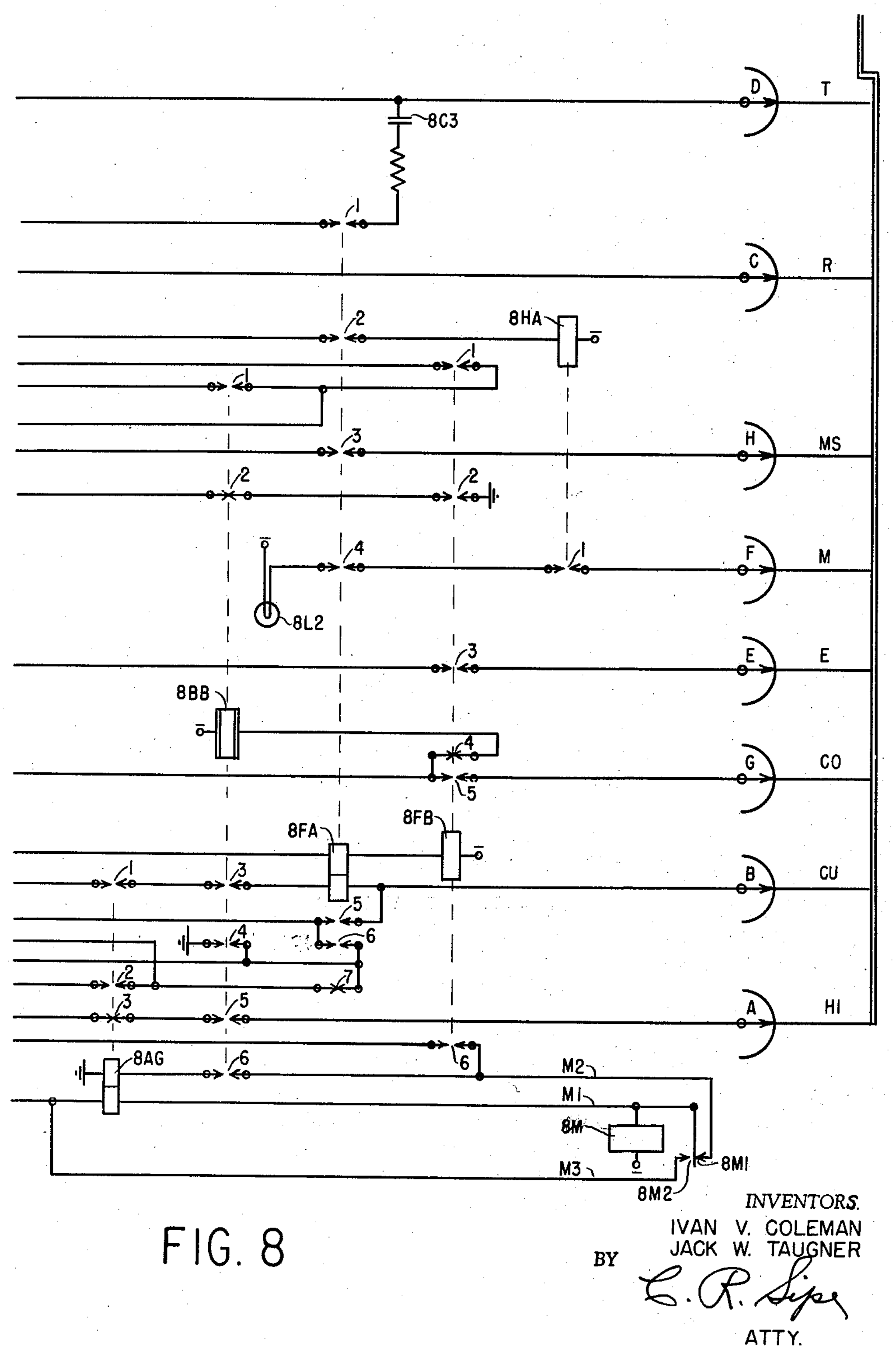
Figure 15:
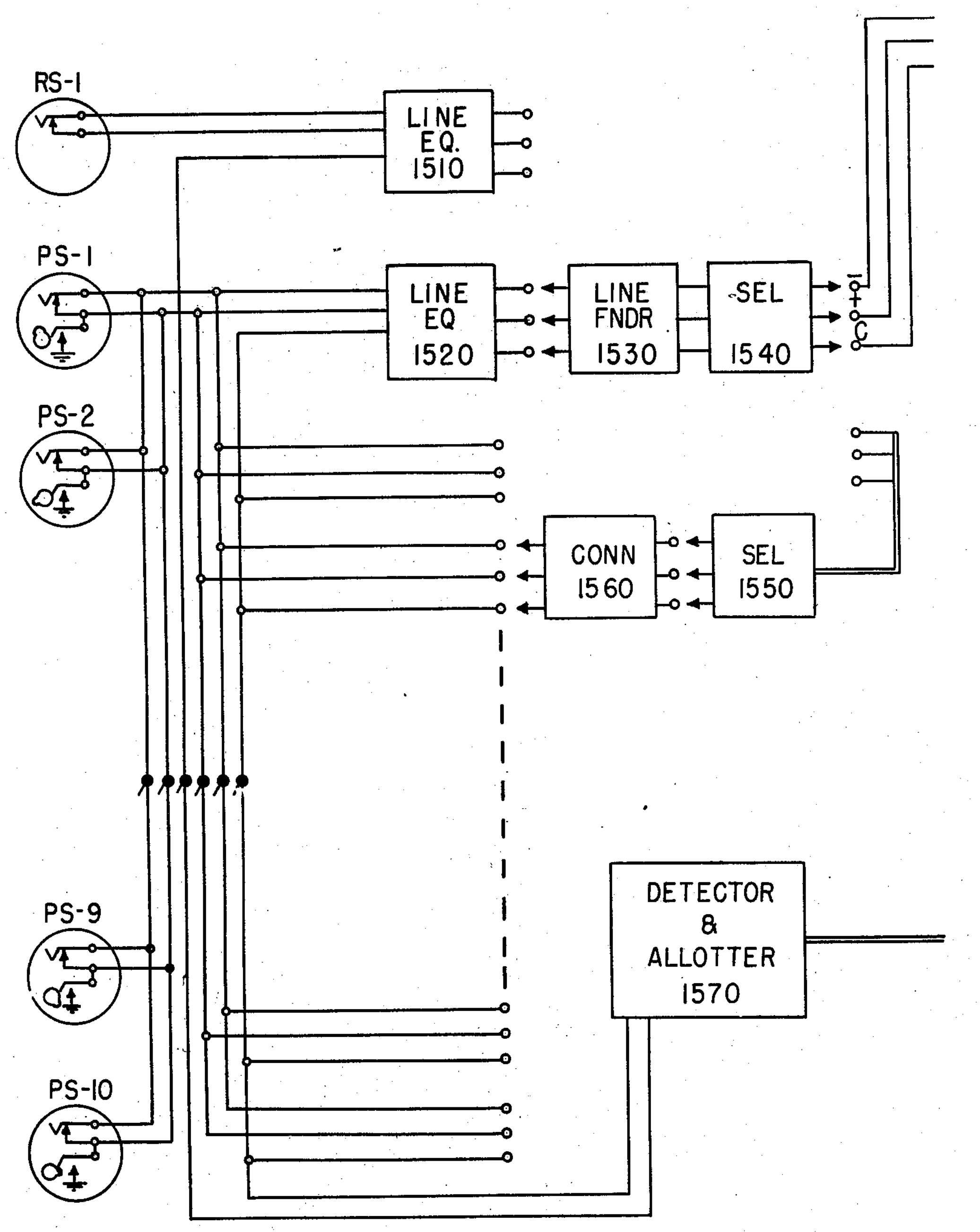
Figure 16:
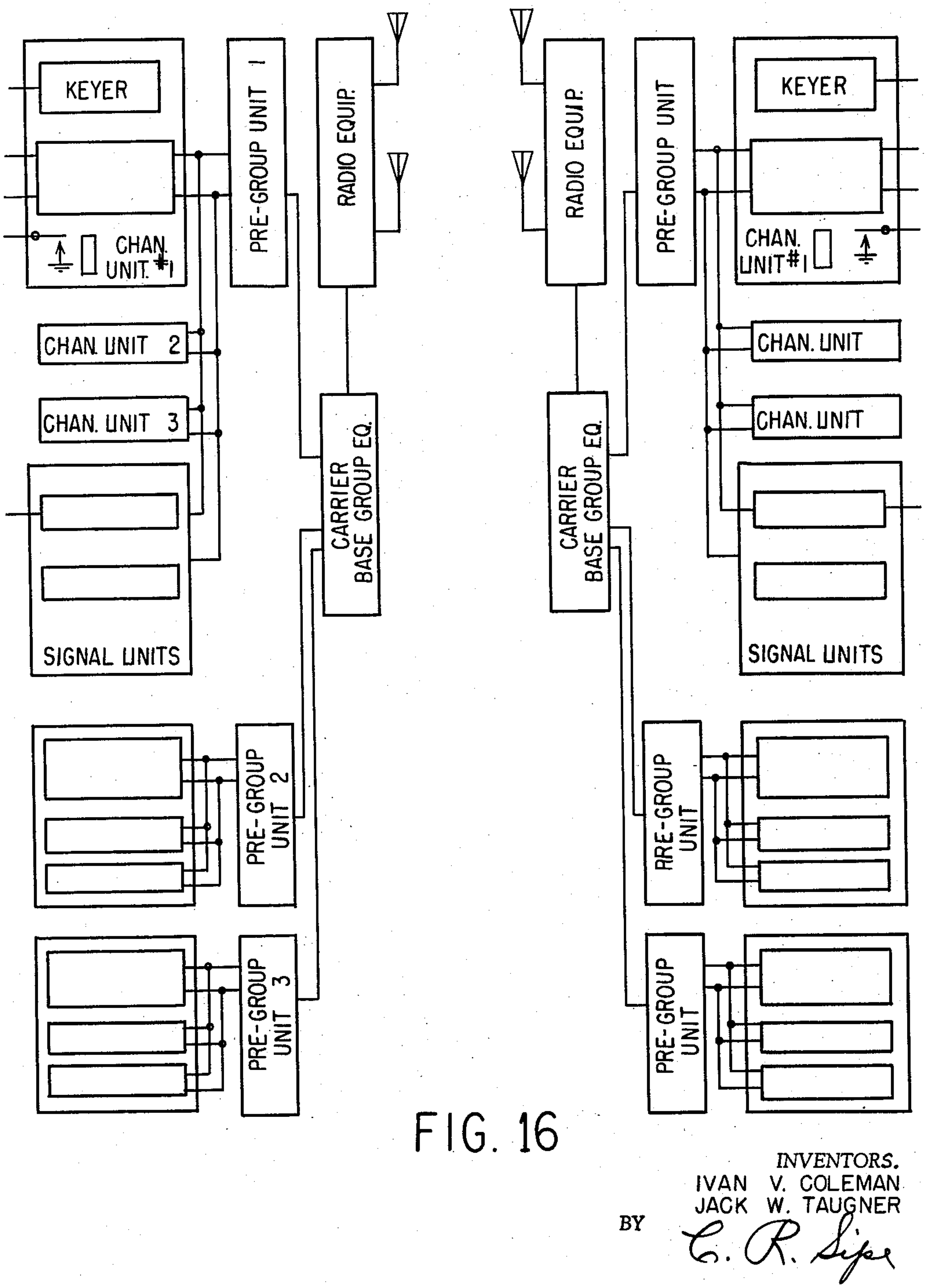

The invention, both as to its organization and method of operation together with further objects and advantages thereover will best be understood by reference to the following specification taken in connection with the accompanying drawings, in which Figs. 1 to 4 inclusive illustrate in schematic form the details of a branch exchange repeater. Figs. 5 and 6 illustrate the details of the incoming trunk circuit located in the main exchange serving the main exchange and branch exchanges. Figs. 7 and 8 illustrate the details of the trunk adapter incorporated in the second branch exchange associated with the repeater of Figs. 1 to 4. Fig. 10 illustrates the exchange equipment in schematic form of the ticketing office. Figs. 11 to 14 illustrate in schematic form the details of a branch exchange repeater that connects to the trunk adapter shown in Figs. 7 and 8 of the tandem exchange. Fig. 15 illustrates in schematic form the details of the second branch exchange. Fig. 16 illustrates in schematic form the carrier and radio equipment linking the ticketing office with the branch exchanges. While Fig. 17 illustrates the manner of combining Figs. 1 to 16, inclusive, of the drawings to form a unified system.

This system is arranged to provide automatic toll ticketing service, on a satellite basis, to the exchanges illustrated in Figs. 1 to 4, 7 to 9 and a part of 16 for one exchange and Figs. 11 to 15 for the other exchange. The toll ticketing center into which these exchanges will work is that illustrated in Figs. 5, 6, 10 and a part of 16.

The toll ticketing center is reached from the first exchange by means of a micro-wave carrier, and from the second exchange by wire circuits to the first exchange and from there it shares the micro-wave carrier channels.

The circuit of Figs. 1 to 4 is designed to provide outgoing service from the first branch exchange having a calling station directory number detector to the main exchange equipped for Type "B" automatic toll ticketing service.

The principle functions of this circuit are as follows:

(1) Provides "E" and "M" 3-channel signalling. The dial pulses are repeated over lead "MS" and the calling party's number is pulsed over lead "M" of the trunk to the distant ticketer under control of lead "E".

(2) Provides transmission battery to calling station.

(3) Registers party identity during digit "0" of access code; blocks digit "0" from being repeated to the ticketer.

(4) Initiates a detection of calling number after digit "0" is dialled.

The circuit of Figs. 5 and 6 is part of the equipment necessary in an automatic toll ticketing system providing type "B" service to a branch exchange. It is located in the main office.

Its function is to connect an outgoing trunk circuit or an intermediate trunk circuit located in an intermediate branch exchange to a type "BD" ticketer located in the main exchange. Signalling between the two offices is done with carrier equipment. When seized, the incoming circuit causes the ticketer hunter to hunt for an idle ticketer.

The incoming trunk circuit receives the detected calling party's number from the branch office and the dial pulses of the called party and forwards this information to the ticketer.

The principal functions of this circuit are as follows:

(1) Seize an idle ticketer.

(2) Stop the ticketer hunter if a ticketer is simultaneously seized by more than one ticketer hunter or selector.

(3) It is accessed from the branch exchange via carrier over five leads; R1, T1, ES, E and M and converts the incoming dial pulses (lead ES) to outgoing loop pulses (leads RU and TU).

(4) Receives detected calling station identity over lead E under control of lead M and forwards this information over leads UHI and ULO to the ticketer.

(5) Provides switch-through under control of the associated ticketer.

(6) Provides busy tone in case of battery failure.

The circuit of Figs. 7 and 8 is used as an adapter circuit between the automatic toll ticketing outgoing trunk circuit which sends out 3-wire physical signalling and carrier equipment which sends out 3-channel "E" and "M" signalling.

The principal functions of this circuit are:

(1) The hunting circuit will advance and continue hunting if two automatic toll ticketing intermediate incoming trunks should simultaneously try to seize the same idle carrier or radio equipment.

(2) Search for idle carrier or radio equipment on absence of ground basis.

(3) Provide access to carrier or radio equipment which is common to automatic toll ticketing outgoing trunk circuits and this circuit. Upon seizure of idle carrier or radio equipment, this circuit busies the associated automatic toll ticketing outgoing trunk circuit.

Figure 9:
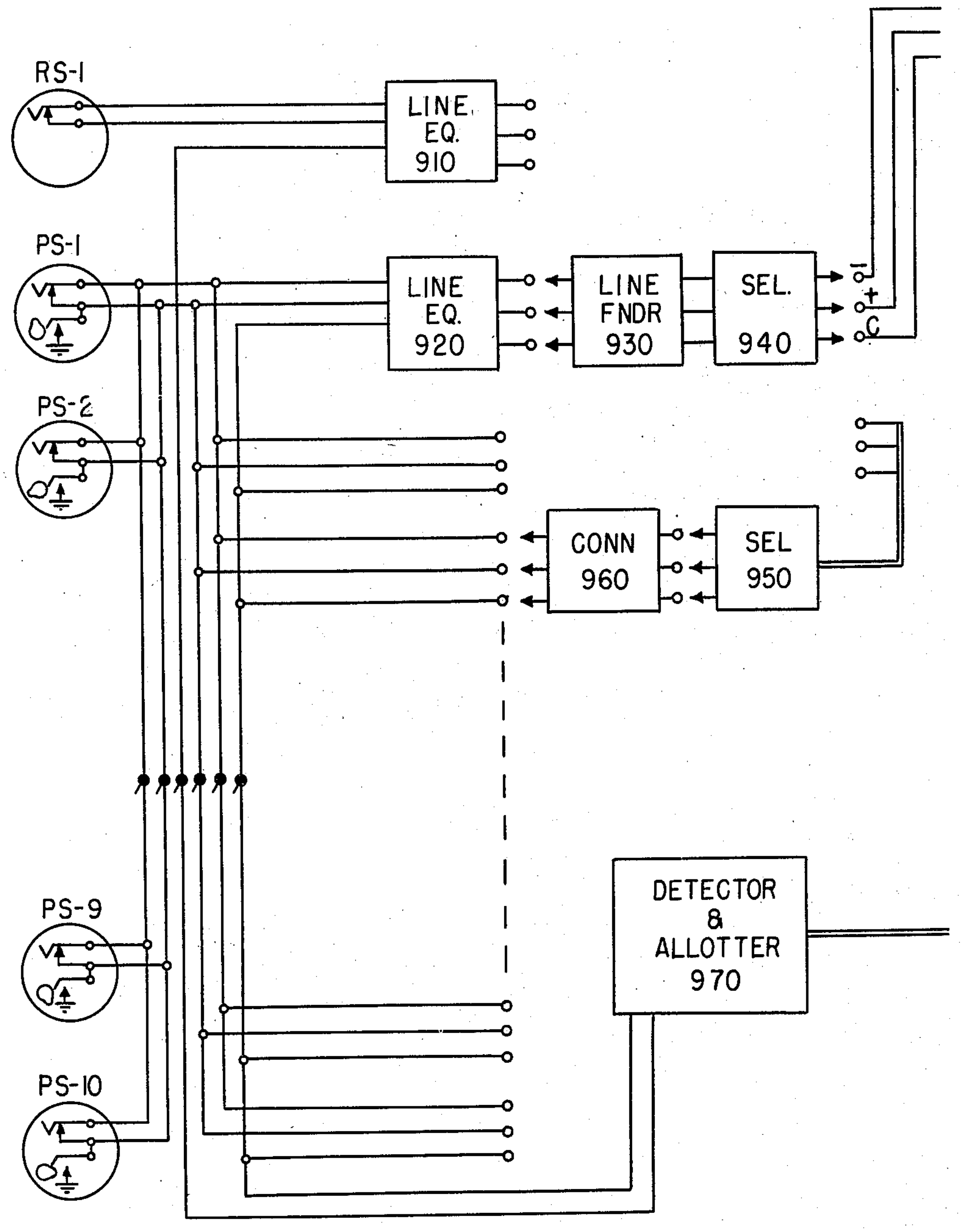
Figure 10:
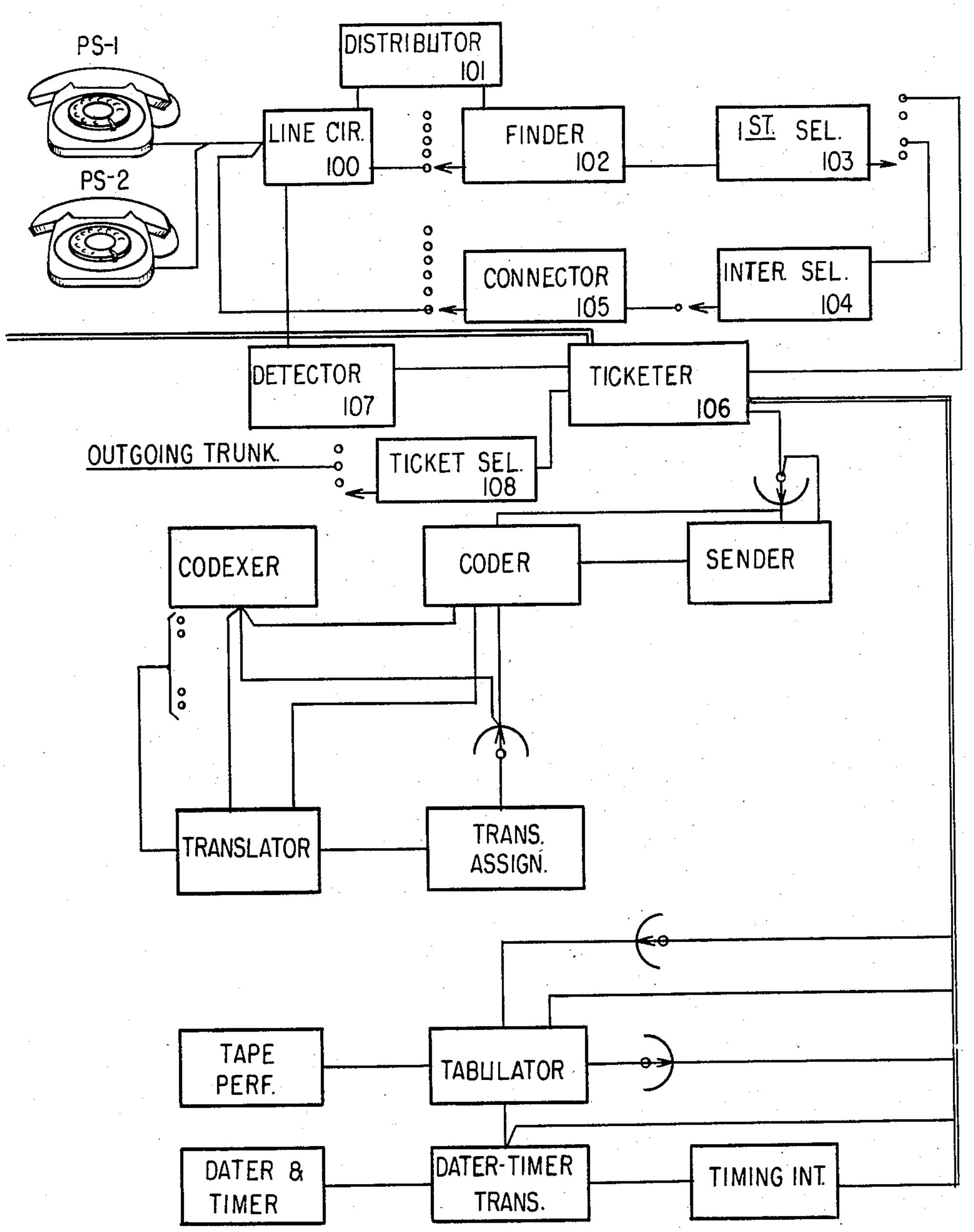
Figure 11:
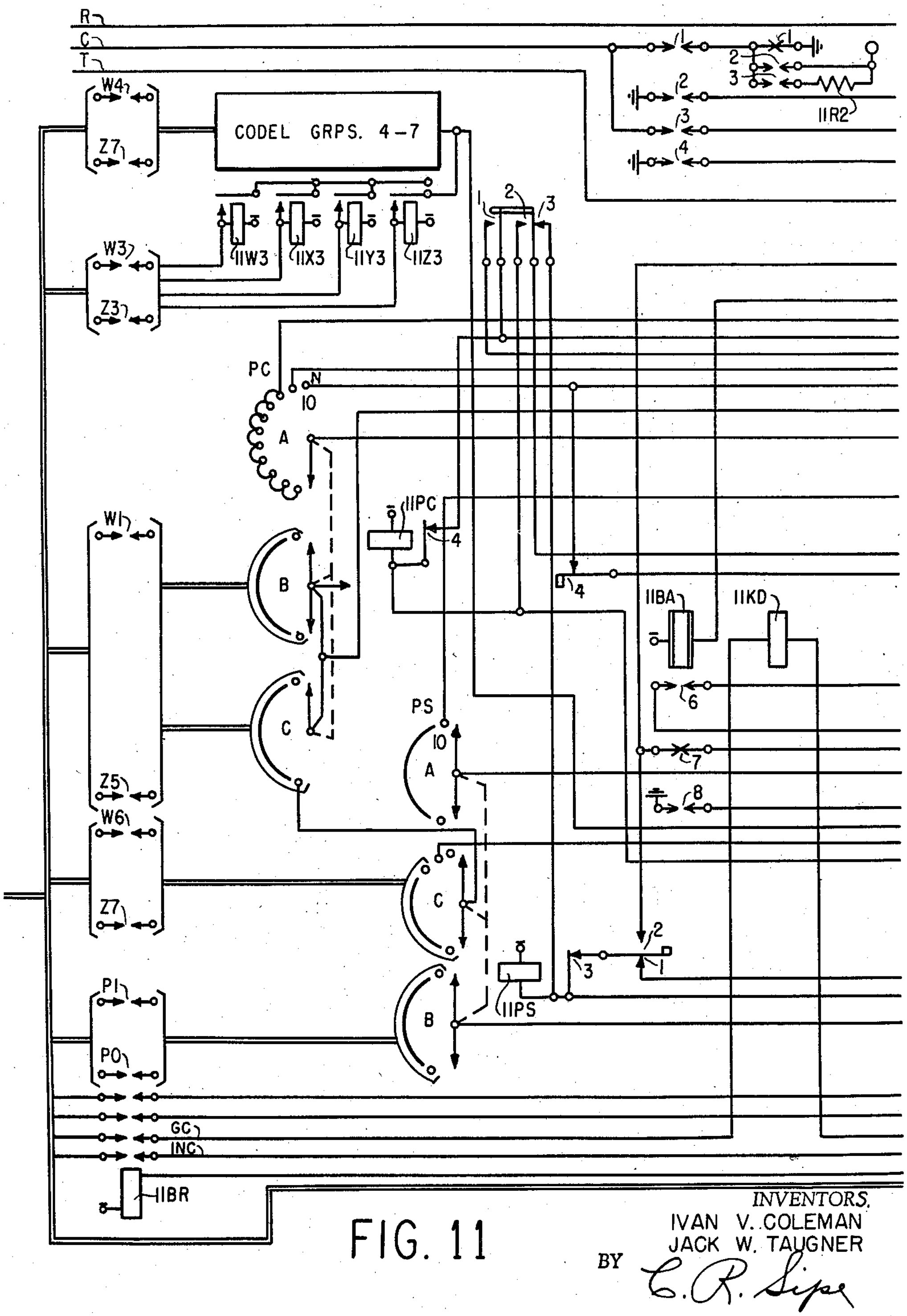
Figure 12:
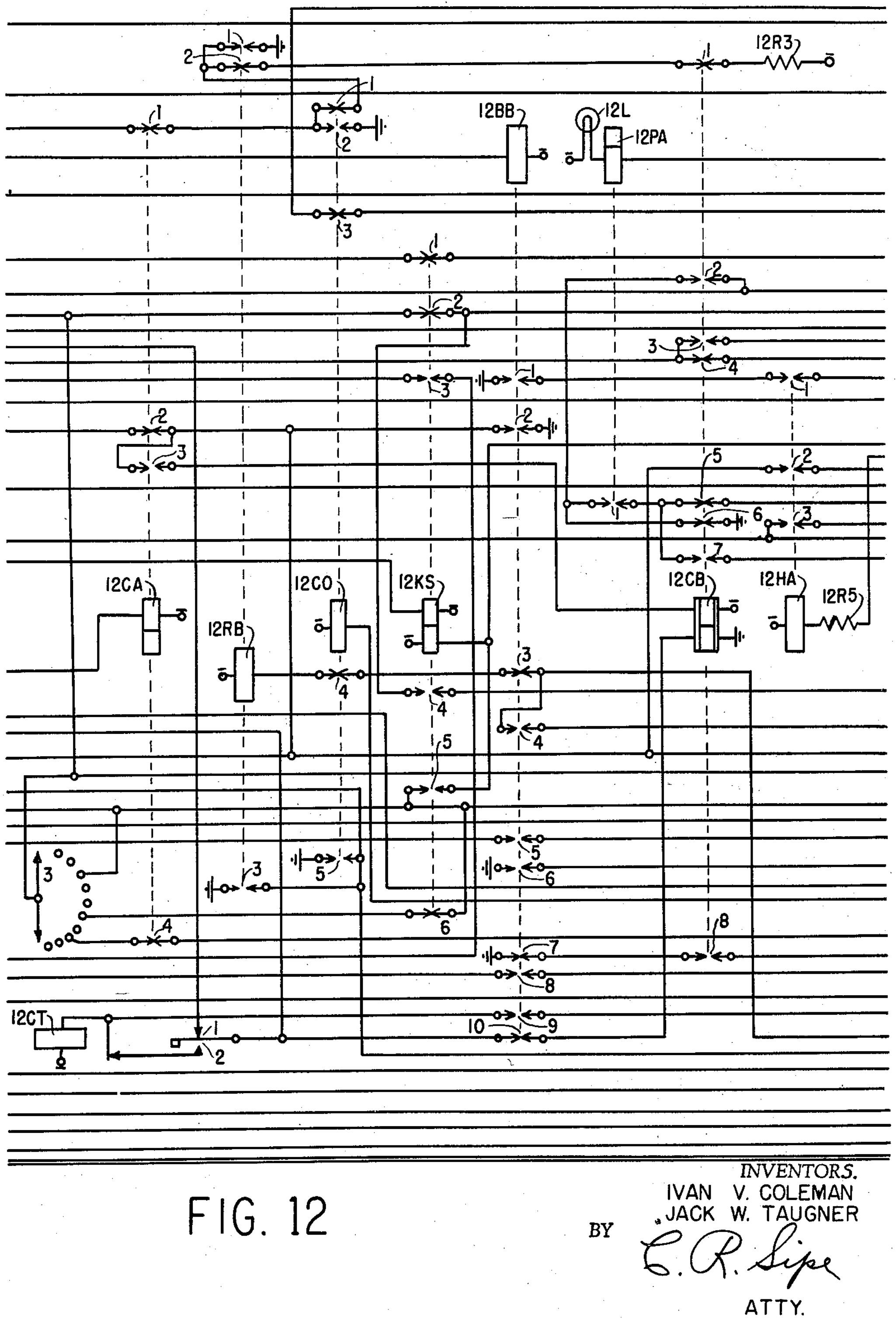
Figure 13:
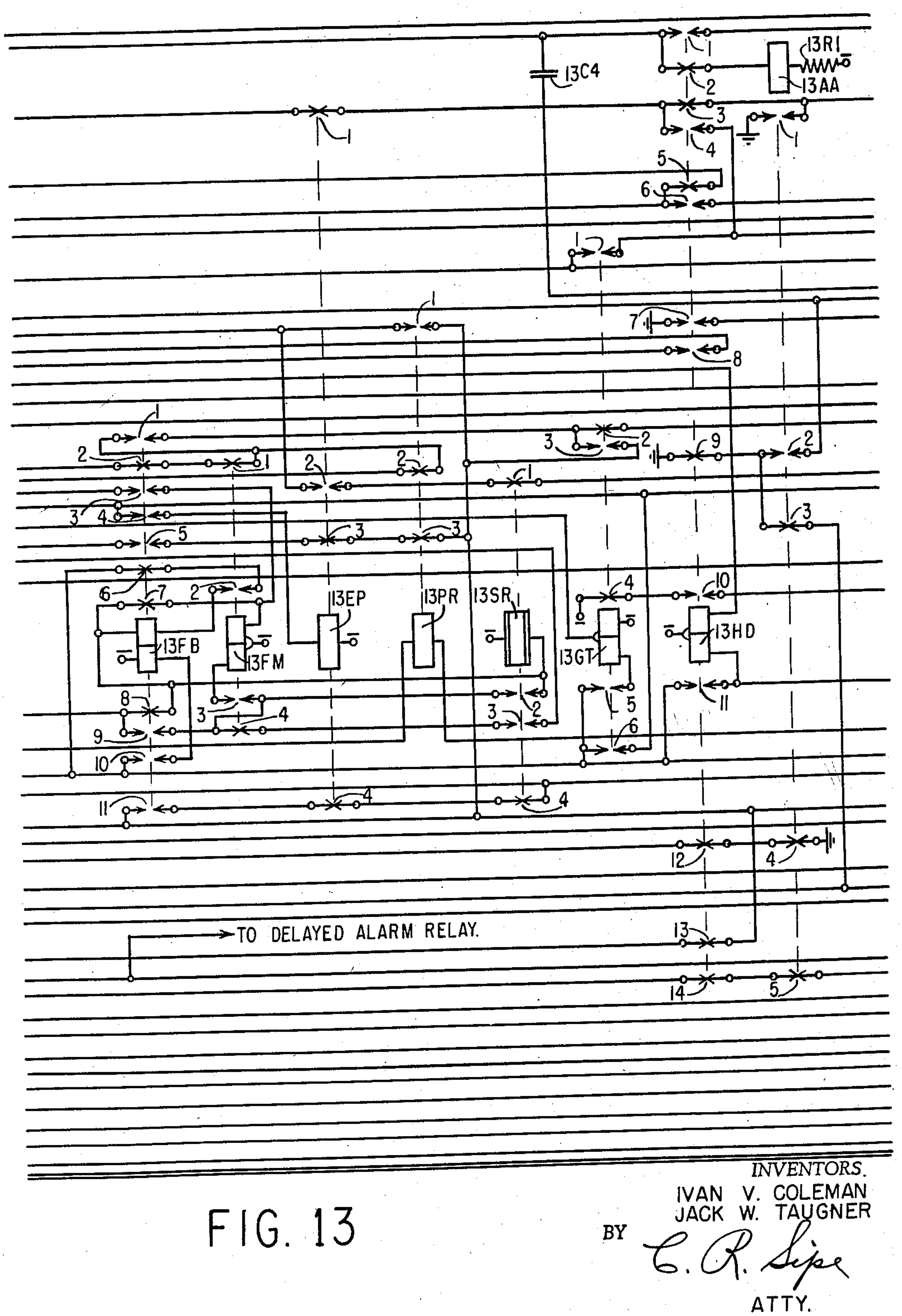
Figure 14:
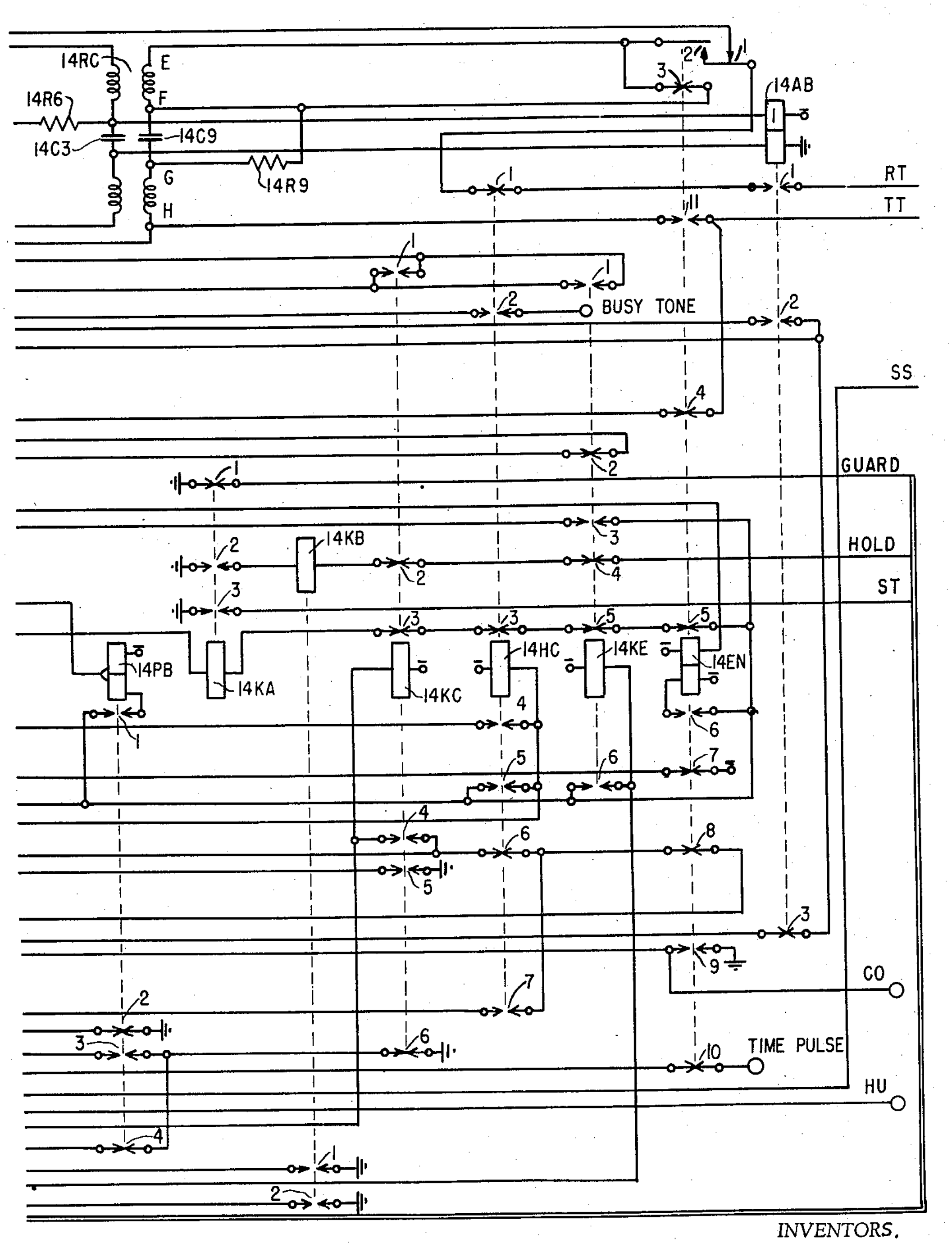

Fig. 9 of the drawing discloses in schematic block diagram form the switching equipment of the first branch exchange, and also includes in block diagram form the detector and detector allotter.

Fig. 10 of the drawing discloses in schematic block diagram form the switching equipment and the automatic toll ticketing equipment of the main exchange. There are illustrated two subscriber stations, associated line equipment, a line finder allotter, a line finder, a first selector, an intermediate selector and a connector of the local exchange equipment; a detector and a ticketer; a transender hunter, a transender sender, a transender coder, a transender codexer, a translator assigner and a translator; a tabulator, a dater and timer circuit, a timer transfer, a pulse and time interrupter and a tape perforator.

In this type of system, it is necessary to dial an access code to seize this circuit. The last digit of the access code is always the party identification digit "0" (zero) on calls originating in exchanges having detecting equipment. On locally originated calls, the party identification digit "0" is the first digit dialled into this circuit.

The principal functions of the ticketer are as follows:

1. FUNCTION COMMON TO ALL CALLS (*a*) It calls for a transender when seized.

(*b*) It repeats to the transender the office code digits on seven or eight digit calls or the area code plus the office code digits (if needed) on ten or eleven digit calls.

(*c*) It absorbs those digits of the called number which are not required for sending.

(*d*) It provides for stop-dial and flashing signal supervision.

(*e*) After an adjustable "grace" period, it times the length of conversation from the time the called party answers until the calling party disconnects.

(*f*) It stores the following ticketing information during conversation: the calling number (7 digits); the called number (7, 8, 10, or 11 digits); and a change in toll rates indication, if it occurs during the call.

(*g*) After the calling party has disconnected, it calls for a tabulator and transfers to it the ticketing information. During this transfer operation, the ticketer is guarded against seizure from another call, but the calling line and the outgoing trunk are released. The ticketer releases after transfer is completed.

(*h*) If the call is not answered, the ticketer releases when the calling party disconnects and no ticketing information is recorded for the call.

(*i*) It provides special markings to the transender when unstandard conditions are encountered.

(*j*) It provides visual supervision of the progress of a call through the ticketer by means of the SUPY lamp.

2. FUNCTIONS OF THE TICKETER PERTAINING TO LOCAL ACCESS CALLS (*a*) It tests for a low-resistance ground leak on the calling line.

(*b*) It determines the party identity and calls for a detection of the calling party's number after the party identification digit "0" has been dialled.

(*c*) It provides for extending the call to a "D" operator should an incomplete detection occur.

3. FUNCTIONS OF THE TICKETER PERTAINING TO REMOTE ACCESS CALLS (TYPE "B" SERVICE)

(*a*) It receives the calling party's number which has been detected in the branch office.

(*b*) It provides for extending the call to a "D" operator should an incomplete detection occur.

The transender hunter circuit is associated with a ticketer and its function is to find or hunt for an idle transender.

The transender coder is an integral part of the transender and as such operates in direct conjunction with the transender codexer and transender sender.

One transender from a common pool is associated with a ticketer while the subscriber dials the called number. It is retained under control of the ticketer until it obtains a routing directive either from the common translator or from the built-in directive in its coder and until it completes the required sending. Upon completion of sending, the ticketer switches through and frees the transender for use on other calls. The functions of the coder are:

(1) When it receives a "skip" control directive and a routing directive from the translator through a bar relay to store them on codel relays.

(2) To route calls to an operator or release the transender and provide busy tone if the translation is of a non-standard nature such as: "TX" translation for failure to dial digit "0." "TY" translation for ground fault on line, "TZ" translation for incomplete detection, "TT" translation for translator assigner failure.

When the coder is used on calls requiring routing directives from the translator, all codel leads and other leads are extended for a brief period to the translator. At the same time, a relay is operated in the translator as determined by the office code and area code dialled by the subscriber. The relay momentarily grounds some of these leads and operates the corresponding relays of the coder extended to it. The operated codel relays in turn place ground on codel leads and thereby make the routing directive available to the transender-sender. Most routing directives consist of fewer digits than the six provided during the interdigital interval following the sending of the preceding routing digit, and upon encountering the first empty codel will cause the coder out sequence switch to "skip" over the remaining codels of the routing digit storage.

The major function of the sender is to control the sending of impulses from the transender. The sending operation is started as soon as the coder has received the routing directive, or the coder may await a signal from the ticketer before starting the sender.

Pulses are generated by a small constant speed motor (48 v. D.C.) to control the sender pulse relay to provided pulses at a uniform speed and pulse ratio. Pulses sent by this circuit are determined by information stored in the coder and ticketer. Pulses are sent over a lead (sender control digit) and over the loop to the ticketer selector (or equivalent switches). An adjustable interdigital pause is provided.

Stop dial supervision can be received during the interdigital period. Upon receipt of a stop signal, the sender extends the interdigital counting interval by 2.2 seconds so that slow flashing busy signals (30 i.p.m.) can be differentiated from momentary stop dial signals. The outgoing trunk and the transender are automatically released when a flash busy is recognized. A stop signal can also be recognized for flash counting purpose during the out-pulsing of a digit, but pulsing will not be interrupted unless a flash is recognized before the digit is completed.

The transender codexers' main functions are:

(1) To receive subscriber dial pulses, inverted and repeated to the transender by a ticketer.

(2) To register the three-digit office of foreign area code on an 800 point Strowger switch to select a code lead extending into the common translator. The selected code lead is marked, and the single code indication is forwarded under control of the translator assigner.

(3) To recognize specific foreign area code requiring dual translation, in which case the area code is stored on rotary switches and the Strowger switch is released and re-positioned on the three-digit office code. The original area code is forwarded via one of five leads and the selected office code lead is marked under control of the translator assigner.

(4) To provide facilities to identify up to five foreign area codes for dual translation.

(5) To provide homing circuits for rotary switches and a release magnet for the Strowger switch with release failure alarm under control of the associated sender unit of the transender.

The translator is a group of relays which is used in conjunction with the transenders for the purpose of supplying the transenders with the necessary routing directive as determined by the first three or six digits registered in the transender on its codexer. The translator is common to the transenders; it is seized only momentarily when a routing directive is required. The connection of the transender to the translator is controlled by the translator assigner. The transender and translator are described in greater detail in the Ostline, Coleman and Taugner application Serial No. 628,474, filed December 3, 1956.

The tabulator circuit's function is to forward toll call ticketing data to tape perforators. The toll call ticketing data consists of information received from the ticketer, the data-timer, the radexer (if provided), and from the tabulator itself.

The information received from the ticketers consists of the ticketer identity number (three digits), conversation time (three digits), called number (seven, ten or eleven digits), calling number (five digits) and a possible change in rates during call conversation timing indication. The information received from the dater-timer consists of the calendar date (day and month), the time of day and a day or night rate indication. The dater-timer is directly connected to the tabulator via a dater-timer transfer circuit. If a radexer is provided, it supplies a two digit call rate determined by the ABC office code of the called number. The information connected directly within the tabulator is the tabulator identity (two digits) and the ABC office code (three digits) of the calling party.

The calling number received from the ticketer is composed of four terminal digits and an office code unit. The office code unit is a special marking to one of ten relays, each of which represents a separate office. Thus, the tabulator is capable of supplying a maximum of ten ABC office codes to the tape perforator.

The tabulator provides for access to as many as fifty ticketers. Under control of the tabulator allotter, it will hunt for and find a ticketer calling for a tabulator.

All data recevied from the ticketer is stored on relays in the tabulator prior to being forwarded to the tape perforator.

When the punched tape is processed for printing a ticket or punching a record card, the tape roll is removed and fed into other equipment in the reverse direction from that of the original punching.

In order that the ticket or punching card come out with a "straight" record of the call, all data is sent in reverse order from the ticketer to the tabulator and from the tabulator to the tape perforators. The tabulator is described in greater detail in the Ostline application Serial No. 625,773, filed December 3, 1956.

The circuit of Figs. 11 to 14 is designed to provide outgoing service from a branch exchange having a calling station directory number detector to a main exchange equipped for Type "B" automatic toll ticketing service.

The principal functions of this circuit are the same as those for the circuit of Figs. 1 to 4 except that it provides for 3-wire D.C. signalling. The dial pulses are repeated via lead "RT" and the calling party's number is pulsed via lead "TT" of the trunk to the intermediate incoming trunk circuit under control of lead "SS."

Fig. 15 of the drawings discloses in schematic block diagram form the switching equipment of the second branch exchange, and also includes in block diagram form the detector and detector allotter.

Fig. 16 of the drawings discloses in schematic block diagram form the carrier and radio equipment utilized for linking the first branch exchange to the main exchange. The carrier equipment shown is that disclosed in the Robert S. Caruthers application, Serial No. 382,689, filed September 28, 1953, though the toll ticketing system may be used with other types of carriers. The radio link equipment may also be of any well known kind and does not in any way determine or affect the performance of the toll ticketing equipment.

The channel unit such as unit #1 normally provides a speech channel with a frequency band width of from 250 to 3100 cycles per second and two signal paths to provide what is commonly known as "E" and "M" signalling. To provide the third signal channel required for each toll trunk connection, one of the carrier telephone voice channels is utilized to provide 24 simultaneous individual tone channels. One of these channels may then be allotted to each of the toll trunks.

Fig. 17 illustrates the manner of combining Figs. 1 to 16 and 17 inclusive of the drawings to form a unified system.

*Detailed operation*

SEIZURE FROM FIRST BRANCH EXCHANGE LOCAL SELECTOR

When the calling subscriber at station 9PS4 (whose directory terminal number is 0004) removes his receiver, the usual loop circuit, including the line conductors 1T and 1R is completed for operating the line circuit 9L2. In response to the completion of the above mentioned loop circuit, the line circuit 9L2 initiates operation of the distributor and marks the terminals of the calling subscriber line in the bank contacts of a group of line finders, including the line finder 9F, having access to the calling subscriber line. For the purpose of this description it will be assumed that the distributor selects the line finder 920 and that it operates its wiper in a vertical and then in a rotary direction in the well known manner to select the terminals in the associated bank terminating the calling line. When the calling line is found by the line finder 9F, it extends the calling line to the individually associated first selector 9S1 and the latter selector transmits the usual dial tone signal to the calling subscriber to indicate that the dialling may be started. The above noted switching apparatus, including the line circuit 9L2, the distributor, the line finder 9F and the first selector 9S1 may be of conventional construction and arrangement and may be, for example, of the type illustrated in the Bakker Patent No. 2,289,896, granted July 14, 1942 and in the Saunders Patent No. 1,849,694, granted March 15, 1932.

Since the calling subscriber at station 0004 intends to extend the connection to a called subscriber in a remote exchange it is necessary to prefix the directory number of the called subscriber with the access code digits "90". Consequently, when the calling subscriber received the dialling tone signal the dial is to be actuated in accordance with the digit 9 to transmit nine loop impulses to the first selector 9S1. This selector then raises its wipers in a vertical direction to the ninth level and then rotates its wipers over the selected level to search for an idle trunk circuit, such as the trunk circuit of Figs. 1 to 4. It will be assumed for the purpose of this description that the first selector 9S1 now extends the connection from the calling subscriber line to the trunk circuit illustrated in Figs. 1 to 4, inclusive. The conductors include the "−" conductor 1T, the "+" conductor 1R and the control conductor 1C. If the trunk circuit is busy, the control conductor will be grounded in order to indicate the busy condition to the first selector 9S1. Thus, as the selector rotates its wipers over the ninth level it will pass over contacts terminating trunk circuits having grounded control conductors corresponding to the 1C conductor.

SEIZURE OF TRUNK CIRCUIT

Battery potential through resistance 2R3 on lead 1C marks this circuit idle to preceding selectors. When seized, the "tip" side 1T of the subscriber's loop is closed through polar relay 2PA and its associated Lamp 2L to exchange battery, and the "ring" side 1R of the subscriber's loop is closed thru relay 3AA and resistor 3R1 to Spotter Battery. Relay 3AA operates, but relay 2PA does not operate at this time. Relay 3AA closes the number one winding of relay 4AB and 1BA. Relay 4AB operates, closes part of the pulsing circuit on lead 4MS, blocks digit "0" from being repeated to the incoming trunk circuit, and prepares a holding circuit to relay 1BA. Relay 1BA operates, connects a multiple ground to the number one winding of relay 4AB, prepares the circuit to relay 2CA, ground lead HU which marks this circuit busy to the Intertrunk Unit, closes a circuit to relay 2BB, closes battery through lamp 4L1 to lead 4MS, and connects ground to lead 1C to hold the preceding equipment and mark this circuit busy. Relay 2BB operates, prepares the circuit to magnets 1PS and 1PC, closes 6 second ground pulses to magnet 2CT, prepares a circuit to relay 3PR via lead E.

DIALLING PARTY IDENTIFICATION DIGIT "0"

As the subscriber dials the party identification digit "0", relay 3AA follows the dial pulses. Relay 1BA, being slow-to-release, remains operated during pulsing. When relay 3AA restores on the first dial pulse, the circuit is closed to relay 2CA and magnets 1PS and 1PC. Magnets 1PS and 1PC operate. Relay 2CA operates and closes a circuit to the number two winding of relay 2CB. Relay 2CB operates, and prepares a circuit to relay 4PB.

At the end of the first pulse, 3AA reoperates, opens the circuit to 1PS and 1PC, recloses the circuit to 1BA. Relay 2CA, being slow-to-release, remains operated during pulsing.

Magnet 1PS may or may not advance its wipers on the remaining dial pulses depending on the SATT "spotter pulse" of the calling party. Further operation of magnet 1PS is described in the section titled "Identification of Calling Party."

When 3AA restores on the second dial pulse, the circuit to magnets 1PS and 1PC and relay 2CA is closed again. At the end of the second dial pulse, 3AA reoperates, opens magnets 1PS and 1PC. Magnets 1PS and 1PC restore and advance their wipers one step.

After the tenth dial pulse, the wipers of switch 1PC are engaged on bank terminal 10.

When the digit "0" has been completed, relay 3AA reoperates and opens 2CA. Relay 2CA restores, opens 2CB, and closes ground to the wipers of level A, rotary switch 1PC. Relay 2CB restores and closes a circuit to the number one winding of relay 3HD. Relay 3HD operates, locks to 2BB, transfers the "ring" side of the line from Spotter Battery to exchange battery through 4R6 and the number one winding of relay 4AB, and the "tip" side of the line from relay 2PA to ground through the number two winding of relay 4AB, opens 3AA, closes 4KA, and places holding ground on relay 1BA. Relay 3AA restores. Relay 4KA operates, closes ground to the Start lead of the Director Assigner 970, removes ground from the Guard lead, and closes relay 4KB to the Hold lead.

IDENTIFICATION OF CALLING PARTY

Type B SATT installations are capable of serving both single party lines and party lines of as many as ten stations. All stations on party lines must be equipped with special "spotter" dials. Stations on single party lines are equipped with regular dials.

The spotter dial differs from the regular dial in that it provides an additional set of spotter springs which can be closed by a special cam during the return of the dial. The spotter springs closed interval is positioned to occur only during the period when the regular pulsing springs are closed. The spotter springs, when closed by the special cam, close a spotter ground pulse on the "tip" side of the line. The spotter cam can be arranged to close the spotter ground pulse on the line after any one of the individual dial pulses. For the first station, the spotter dials are adjusted to send a spotter pulse after the first dial pulse of the digit "0." For the second station, the spotter dials are adjusted to send a spotter pulse after the second dial pulse of the digit "0." The third, fourth, fifth, sixth, seventh, eighth, ninth, and tenth stations on a party line are arranged accordingly.

For purposes of this explanation, assume the calling station to be the fourth station on a party line. Thus, no spotter pulse will be closed via "tip" side of the line to lead 1T until after the fourth dial pulse.

Now consider what happened to switch 1PS as the digit "0" was being dialled. Switch 1PS stepped to bank terminal 1 after the first dial pulse. As relay 3AA follows the second, the third, and fourth dial pulses, the wipers of switch 1PS are advanced to bank terminals 2, 3 and 4. Immediately after the fourth dial pulse, the spotter dial closes a spotter pulse via the "tip" side of the line to lead 1T.

Relay 2PA is a high speed polarized relay which will not operate from Spotter Battery over the normal dialling loop, but will operate from exchange battery when a "spotter" ground pulse appears on lead 1T. Relay 2PA operates during the interdigital pause between the 4th and 5th dial pulse and closes ground via contacts 3HD9, 3AA2, 2CB2, 2PA1, 2CB7 to the #1 winding of 4PB. Relay 4PB operates and locks through its "X" contacts 4PB1, opens the pulsing circuit to switch 1PS which engages on bank terminal 4, and transfers ground from lead 1P0 to terminal 4. When bar relay 1BR operates later, this ground will be closed to lead 1P4 to the Detector Assigner 970 to indicate the party identity of the calling station. Further dial pulses do not affect switch 1PS.

If the calling station has a single party line, no spotter pulses are closed to lead 1T. Switch 1PS follows the 10 dial pulses of digit "0" and steps to bank terminal 10. Since relays 2PA and 4PB do not operate, ground remains on lead 1P0 to indicate a single party line.

Although the spotter pulses may appear on the "tip" side of the line during the dialling of subsequent digits, they are ineffective to relay 2PA.

INITIATING DETECTION CYCLE

Ordinarily the detection cycle is so rapid it will occur shortly after the digit "0" is completed. Ground on lead Start and absence of ground on lead Guard indicate to the Detector Assigner 970 that a detection of a calling number is desired by an Outgoing Trunk Circuit. When the Detector Assigner steps to this circuit, relay 4KB operates over lead Hold in series with a relay in the Detector Assigner 970. Relay 4KB closes bar relay 1BR and 1KD. Bar relay 1BR operates and closes leads 1W3 through 1Z7, 1P1 through 1P0, and 1EB to the Detector, and closes leads INC and GC to the Detector Assigner. Ground appearing on lead GC causes relay 1KD to operate and replace ground with +80 v. Detector Battery on lead 1C. During the detection cycle, the Detector Assigner may momentarily remove ground from lead GC causing relay KD to pulse and momentarily remove the +80 v. Detector Battery.

In the course of the detection cycle, the Detector closes ground to the various 1W3 through 1Z7 leads. These grounds represents, in codel code, the equivalent office code and terminal number of the calling station. Codel relays in Codel 3 through 7 operate from these grounds and lock to store the calling number. The decimal equivalents of the W, X, Y, Z, codel relays are described in section titled "Transferring Calling Party's Number to the Ticketer."

When the detection is completed, the Detector closes ground to lead EB. Relay 4KC operates, locks, opens the circuit to relays 4KA and 4KB, closes a circuit to magnet 1PS via its INT springs and RSON springs, and prepares the circuit for relay 2KS. Relay 2KS restores, removes ground from lead Start and closes ground to lead Guard. Rotary switch 1PS steps self-interrupted to normal and prepares a circuit to the number one winding of relay 2KS.

Relay 4KB restores, opens 1KD and bar relay 1BR. Bar relay 1BR restores. Relay 1KD restores and replaces +80 v. D.C. detector battery with ground on lead 1C. Resistor 1R2 is used in conjunction with "X" makes on relay 1KD to facilitate application of Detector battery to the "C" lead without dropping the switch train and without burning springs when ground is connected to the +80 v. Detector Battery.

DIALLING CALLED NUMBER

Resistance battery through lamp 4L1 on lead 4M seizes the carrier equipment channel unit #1 of Fig. 16. The line loop to relay 4AB was closed as explained in section titled "Dialing Party Identification Digit 0." The subscriber dials digit "A" of the office code and relay 4AB follows these pulses. When 4AB restores on the first pulse, a circuit is closed to 2CA. Relay 2CA operates, removes ground from the wipers level A of switch 1PC, and closes 2CB. Relay 2CA remains operated during pulsing of digit "A" due to its slow-to-release characteristics. Relay 2CB operates and prepares a circuit to magnet 1PC. After digit "A" has been dialled, relay 4AB restores and opens the circuit to relay 2CA. Relay 2CA restores, opens 2CB, and closes a circuit to magnet 1PC via the level A wipers of switch 1PC, bank contact #10 and the INT. springs 1PC4 of 1PC. The INT. springs 1PC4 operate and open magnet 1PC. Switch 1PC advances its level A wipers one step to bank contact "N." Relay 2CB restores.

A circuit is now closed via the wipers level A of switch 1PC, bank contact "N" and the RSON springs 1PS4 of switch 1PS to the number one winding of relay 2KS. Relay 2KS operates, locks, opens the "homing" circuit of switch 1PS, closes ground to magnet 1PS via the RSON 1PS1 and INT springs 1PS3 of switch 1PS, prepares a circuit to the number one winding of relay 3FM and 3SR, and closes 2HA. The INT springs 1PS3 of switch 1PS operate and switch 1PS advances its wipers to bank contact #1. Relay 2HA operates and closes resistance battery through lamp 4L2 on lead 4M to the carrier equipment. This signals the carrier equipment that the calling party's number is ready to be sent. The carrier equipment immediately returns a pulsing ground on lead 4E to control the sending of the calling party's number as explained in section titled "Transferring Calling Party's Number to the Ticketer."

Relay 4AB follows the dial pulses of each digit of the called number including digit "A" of the office code. These digits are repeated to the carrier equipment as resistance battery pulses through lamp 4L2 on lead 4MS.

TRANSFERRING CALLING PARTY'S NUMBER TO THE TICKETER

The calling party's number, detected by the Detector, stored on the Codels, is transferred to the carrier equipment in the following manner. Relay 3PR follows the ground pulses on lead 4E as explained in the preceding section.

On the first pulse, relay 3PR operates, closes a circuit to the number one winding of relay 3FM and to relay 3SR, and opens 2HA. Relay 2HA restores and opens lead 4M. Relay 3FM operates and shorts the number one winding of relay 3FB. Relay 3SR operates and prepares its own holding circuit and a pulsing circuit to magnet 1PC. After the first pulse, relay 3PR restores, and opens the number one winding of relay 3FM, opens 3SR, and removes the short from the number one winding of relay 3FB. Relay 3FB operates and closes its "X" contacts 3FB10 which complete a circuit to the number two winding of relay 3FB. Relay 3FB operates fully, prepares a circuit to relay 3EP, opens the circuit to winding number one of relay 3FM, and transfers the operating circuit of relay 2HA to the wipers of switches 1PC and 1PS. Relay 3FM restores.

On the second pulse, relay 3PR reoperates, recloses 3SR, and energizes magnet 1PC via its RSON contacts 1PC3. After the second pulse, relay 3PR restores, opens 3SR, and opens magnet 1PC. Switch 1PC steps the wipers of level B to bank contact #1. Relay 3SR will remain operated during pulsing due to its slow-to-release characteristics.

After relay 3PR has restored after each pulse and if a grounded code lead is encountered (W1 to Z7), a circuit is closed to 2HA. Relay 2HA operates, closes resistance battery through lamp 4L2 to lead 4M, closes a circuit to the number one winding of relay 3FM, and closes a holding circuit to magnet 1PC or magnet 1PS. Switch 1PC (or PS) is prevented from stepping until relay 3PR reoperates on the next pulse. Relay 3FM operates and is held on its #2 winding when relay 3PR reoperates. Relay 3PR reoperates, opens 2HA, opens magnet 1PC (or 1PS), and closes a circuit to the number two winding of relay 3FM. Switch 1PC (or 1PS) steps to the next bank contact. Relay 2HA restores, opens the holding circuit for magnet 1PC (or 1PS), and opens the circuit to the number one winding of relay 3FM. Relay 3PR restores, closes 2HA, and opens the circuit to the number two winding of relay 3FM.

If the succeeding code lead is grounded, relay 2HA reoperates and operates as described above.

If the succeeding code lead is not grounded, relay 2HA does not reoperate and relay 3FM restores and switches 1PC (or 1PS) may continue scanning as described above.

The wipers of level B, switch 1PC will scan code leads 1W1 to 1X3, and then the wipers of level C, switch 1PC will scan code leads 1Y3 to 1Z5. When the wipers of level C arrive at bank contact "N," the RSON springs of switch 1PC restore and transfer the pulsing circuit to magnet 1PS. The wipers of level C, switch 1PS scan code leads 1W6 to 1Z7.

A circuit is closed to relay 2HA via the contacts 4KC5 of relay 4KC and bank contact #9, level C of switch 1PS. Relay 2HA operates, closes magnet 1PS, and marks lead 4MS. A ground pulse is closed on lead 4E to operate relay 3PR. Relay 3PR operates, opens 2HA, and opens magnet 1PS. Relay 2HA restores. Switch 1PS steps to bank contact #10. After the last pulse on lead 4E, relay 3PR restores.

When the wipers of level A, switch 1PS arrive at bank contact #10, a circuit is closed to relay 3EP. Relay 3EP operates and prepares a circuit to 4EN. Relay 3SR restores and opens the pulsing circuit to 1PS.

The codel relay combinations and their decimal equivalents are as follows:

| | |
|---|---|
| WX 1 | YZ 6 |
| WY 2 | W 7 |
| WZ 3 | X 8 |
| XY 4 | Y 9 |
| XZ 5 | Z 0 |

SWITCH-THROUGH

When the carrier equipment has received the dialled number and the calling party's number and all necessary routing digits have been sent from the main ticketing office or, in case of "no detection," connection has been made to a BD operator, ground is closed on lead E. Relay 3PR operates and closes 4EN. Relay 4EN operates, locks to relay 2BB through its "X" contacts 4EN6, closes the transmission circuit, opens the holding circuit to 4PB, 3PR, 4KC, 2KS, and the Codels, opens the pulsing circuits to magnet 3CT, and closes 2CO. Relay 2CO operates, closes multiple ground on lead HU, and removes line termination between leads T1 and R1. Relays 4PB, 3PR, 4KC, 2KS, and the Codels restore.

PREMATURE DIALLING

If the subscriber dials the first digit of the called number before idle carrier equipment is encountered or before a ticketer or transender has been seized, ground pulses are returned on lead 4E to pulse relay 3PR. Relay 2KS has not operated yet. During the first pulse, relay 3PR operates and closes a circuit to 4HC. Relay 4HC operates, locks to 2BB, closes 3HD, opens lead 4MS, and closes Busy tone to lead 1R. Relay 3HD operates as explained in the section on dialling party's identification digit.

Subsequent operations are as explained in the section titled "Release From a Completed Call" with the following exceptions: Relay 4HC and 4PB restores after 2BB restores. Relay 4EN is not operated at this time.

INCOMPLETE DETECTION

If an incomplete or double detection occurs in the Detector, ground is closed to lead 1INC. Relay 4KE operates, opens 4KA, and opens the wipers of level B and C, switch 1PC. Relay 4KA restores, opens 4KB, removes ground from lead Start and closes ground to lead Guard. Relay 4KB restores, open bar relay 1BR, and opens 1KD. Bar relay 1BR restores. Relay 1KD restores and replaces +80 v. D.C. detector battery with ground on lead 1C.

The first digit of the called number is dialled. Switch 1PC steps the wipers of level A to bank contact "N" and closes a circuit to the number one winding of relay 2KS. Relay 2KS operates and closes 2HA. Relay 2HA operates and closes resistance battery through lamp L1 to lead 4M which seizes the idle carrier equipment. A pulsing ground is returned on lead 4E to pulse relay 3PR. During the first pulse, relays 3FB, 3FM, and 3SR operate as explained in the section titled "Transferring Calling Party's Number to the Ticketer." When 3FB operates, a circuit is closed to relay 3EP. Relay 3EP operates. Succeeding pulses into 3PR cause switch 1PC to start scanning the Codels. Since relay 4KE has already operated and opened the level B and C wipers of switch 1PC, no Codel mark will be repeated to the incoming trunk circuit via lead 4M.

Since no ground has been repeated to the incoming trunk while scanning the first four bank contacts, it stops closing pulses to 3PR. Relay 3PR restores and opens 3SR. Relay 3SR restores. When dialling has been completed, ground is again closed to lead 4E to operate 3PR. Relay 3PR operates and closes 4EN. Relay 4EN operates and "switches through" as explained in the section titled "Switch-Through" with the following exceptions: Relay 4KC and 2KS are not operated and relay 4KE is operated.

Subsequent operations are as explained in the section titled "Release From a Completed Call" with the following exceptions: Relay 4KE restores after relay 2BB restores.

GROUND FAULT ON LINE

If there is a low-resistance ground leak on either the "tip" or "ring" side of the calling line, relay 2PA will operate either as the circuit is seized or as the first dial pulse is received. Relay 2PA operates and closes a circuit to the number one winding of relay 3GT. Relay 3GT operates and locks through its "X' contacts 3GT5 to 2BB, prepares to close 2HA and 3EP.

The first digit of the called number is dialled. Switch 1PC steps the wipers of level A to bank contact "N" and closes a circuit to winding number one of relay 2KS. Relay 2KS operates and closes a circuit to relay 2HA. Relay 2HA operates and closes resistance battery through lamp 1L1 to lead 4M which seizes the idle carrier equipment. A pulsing ground is returned on lead 4E to pulse relay 3PR. During the first pulse, relays 3FB, 3FM and 3SR operate as explained in the section titled "Transferring Calling Party's Number to the Ticketer."

When relay 3FB operates after the first pulse, a circuit is closed to 3EP and 2HA. Relay 3EP operates and prepares a circuit to 4EN. Relay 2HA operates and closes resistance battery through lamp 4L2 on lead 4M. This mark on lead 4M is an additional pulse to the incoming trunk before switch 1PC steps. This additional pulse is the ground fault indication. Lead 4E is opened. Relay 3SR restores. When dialling has been completed, ground is again closed to lead 4E to operate 3PR. Relay 3PR operates and closes 4EN. Relay 4EN operates and "switches-through" as explained in the section titled "Switch-Through" with the following exception: Relay 3GT is operated. The ticketer will either route the call to an operator or close busy tone to the subscriber.

Subsequent operations are as explained in the section titled "Release From a Completed Call" with the following exceptions: Relay 3GT restores after relay 2BB restores.

FAILURE TO DIAL PARTY IDENTIFICATION DIGIT "0"

In order for relay 3HD to operate upon completion of the first digit, it is necessary that the wipers of level A, switch 1PC, be engaged on bank contact #10. Should the subscriber fail to dial the party identification digit "0," relay 3HD will not operate.

If any digit other than "0" is dialled, relay 2CA restores after the last pulse and closes 4HC via bank contacts #1 to #9, level A of switch 1PC. Relay 4HC operates, locks to relay 2BB, closes 3HD, opens lead 4MS, and closes Busy tone to lead 1R. Subsequent operations are as explained in the section titled "Premature Dialling."

TIME-OUT FEATURE

If the calling party has not dialled the party identification digit "0" within 18 seconds from seizure of this switch, ground appearing on bank terminal 3 of switch 2CT is closed to 4HC via the multipled level A bank terminals 1 to 9 of switch 1PC. Relay 4HC operates, locks, removes resistance battery through lamp 1L1 from lead 4MS, closes 3HD and closes Busy Tone to lead 1R. Relay 3HD operates, locks to ground at 2BB, and transfers leads 1R and 1T from relays 3AA and 2PA to relay 4AB. Relay 3AA restores.

If no detection indication (Complete, Incomplete or Ground Fault) has been received or the calling party has not dialled the first digit of the called number within 30 seconds from seizure, ground appearing on bank terminal 5 of switch 2CT is closed to 4HC. Relay 4HC operates, locks, closes Busy Tone to lead 1R and removes resistance battery through lamp 1L1 from lead 4MS. (If relays 4KA and 4KB and bar relay 1BR are still operated, they will restore at this time.)

If switch-through has not occurred within 48 seconds after seizure, relay 4HC operates, locks, removes resistance battery through lamp 1L1 from lead 4MS, and closes Busy Tone to lead 1R.

*Release*

RELEASE FROM A COMPLETED CALL

When the calling party disconnects, the loop to 4AB is opened. Relay 4AB restores, opens lead 4MS, opens 1BA, and closes 2CA. Relay 2CA operates and closes 2CB. Relay 2CB operates and prepares the Delayed Alarm circuit. Relay 1BA restores, releases 2BB, and opens 2CA. Relay 2BB restores, opens 3HD, 3EP, 3FB, and 4EN, and closes the number one winding of relay 2CB to magnets 2CT and 1PS. Switches 1PS and 2CT step self-interrupted to normal. When 2CT is normal, its RSON springs open and transfer the "homing" circuit to magnet 1PC. Switch 1PC steps self-interrupted to normal. When at normal, its RSON springs open and release 2CB. Relay 2CB restores. Relay 3EP restores. Relay 3FB restores. Relay 4EN restores, opens the transmission circuit and relay 2CO. Relay 2CO restores and removes ground from lead HU which marked this circuit busy. Relay 3HD restores, transfers lead 1R from the number one winding of relay 4AB via the repeat coil 4RC to relay 3AA, and transfers lead 1T from the number two winding of relay 4AB via the repeat coil 4RC to relay 2PA. Relay 2CA restores. The associated incoming trunk removes ground from lead E. The circuit is now at normal.

RELEASE FROM TIMED-OUT CONDITION

When the calling party disconnects, the loop is opened to 4AB. Relay 4AB restores, opens 1BA, and closes 2CA. Relay 2CA operates and closes 2CB. Relay 2CB operates. Relay 1BA restores, opens 2BB, and opens 2CA. Relay 2BB restores, opens 4HC and 3HD, and closes low resistance ground to magnet 2CT. Relay 3HD restores, transfers lead 1R from the number one winding of relay 4AB via repeat coil 4RC to 3AA and lead 1T from the number two winding of relay 4AB via repeat coil 4RC to 2PA. Relay 4HC restores and removes Busy tone from lead 1R. Relay 2CA restores due to its slow-to-release characteristics. In the meantime, switch 2CT steps its wipers self-interrupted to the normal position. The RSON springs restore and open the circuit to relay 2CB. Relay 2CB restores. The circuit is now at normal.

ASSOCIATED INTERMEDIATE INCOMING TRUNK UNITS

When the intermediate incoming trunk circuit Figs. 7 and 8 completes a call to the carrier equipment, it will busy the associated outgoing trunk circuit by closing ground to lead 4CO. Relay 2CO operates, grounds lead 1C which marks this circuit busy to the preceding selectors, and grounds lead 4HU.

Upon release of the intermediate incoming trunk, lead 4CO is opened. Relay 2CO restores and opens leads 4HU and 1C. The circuit is at normal.

ASSOCIATED INCOMING TRUNK BUSY

When the associated incoming trunk of Figs. 5 and 6 is taken out-of-service, ground is closed via lead 4E to relay 2RB. Relay 2RB operates, grounds lead 4HU which marks this circuit busy to the intermediate incoming trunk circuits, and grounds lead 1C which marks this circuit busy to the preceding selectors. Relay 2RB restores when the associated incoming trunk is returned into service and opens leads 4HU and 1C. The circuit is normal.

SEIZURE OF INCOMING TRUNK CIRCUIT

When seized, ground is closed from the carrier equipment of Fig. 16 on lead 5ES to relay 5AA. Relay 5AA operates and closes ground to 5BB. Relay 5BB operates, closes lead 6HU to contacts 6M1, and closes ground to the number two winding of relay 5AG.

HUNTING FOR IDLE TICKETER

If the associated Ticketer is busy, ground appears on leads 6HU and 6CU. Ground on lead 6HU shorts the number two winding of relay 5AG and operates magnet 6M in the ticketer hunter. The INT. springs 6M2 operate and open the circuit to magnet 6M. Magnet 6M restores and steps the rotary switch to another Ticketer. The INT. springs 6M1 restore. This self-interrupted stepping continues until an idle Ticketer is encountered or the subscriber dials.

SEIZING A TICKETER

When an idle Ticketer is encountered, 500-ohm resistance battery appears on lead 6CU and absence of ground appears on lead 6HU, thus removing the short from the number two winding of relay 5AG. Relay 5AG operates from battery through magnet 6M and closes its "X" contacts 5AG1 first, closing ground through the number one winding of relay 5FA to lead 6CU. Relay 5FA operates its "X" contacts 5FA4 first, opens the operating path from relay 5JT before 5AG operates fully, and closes a circuit to the number two winding of relay 5FA in series with 5FB. Relay 5AG, in operating fully, opens lead 6HU from magnet 6M to prevent stepping of the Ticketer Hunter as the Ticketer is seized. Relay 5FA operates fully, closes a loop via leads 6RU and 6TU to seize the Ticketer, and closes ground to lead 6CU shunting the number one winding of relay 5FA.

Relay 5FB operates, opens 5BB, and closes relay 5ML to lead 6UML. However, before 5BB restores the seized Ticketer closes ground to lead 6CU to hold 5FA and 5FB and to lead 6HU to mark itself busy to other Ticketer Hunters and Selectors. Relay 5BB restores, opens the circuit to the number two winding of relay 5AB, removes the short from the number one winding of relay 5FA, removes ground from lead 6TCA and prepares the pulsing path for relay 6PR. Relay 6PR restores. The incoming trunk circuit is now ready to receive the subscriber's dial pulses.

REPEATING DIAL PULSES

When the subscriber begins to dial the called office number, the pulses appear on lead 5ES. Relay 5AA follows the dial pulses on lead 5ES and opens the loop over leads 6RU and 6TU each time it restores. In this manner, the dial pulses on lead 5ES are repeated as loop pulses to the Ticketer over leads 6RU and 6TU.

FORWARDING CALLING PARTY'S NUMBER

After the subscriber has dialled the first digit of the called number, the outgoing trunk in the branch office closes ground via lead E to the number two winding of relay 6HA. Relay 6HA operates and closes ground from contact 6PR8 to energize the number two winding of relay 6PR and causes capacitor 6C4 to discharge through the number one winding of relay 6PR. The two windings of relay 6PR being energized in opposition delays the operation of the relay until the capacitor has almost completely discharged. When relay 6PR operates, it opens the ground from contact 6PR8, thus opening the discharging circuit of the capacitor, closes a locking circuit to the number one winding of relay 6HA, closes magnet 6PC, and closes resistance battery through lamp 6L1 on lead 5M, causing the outgoing trunk to open lead 6E. Magnet 6PC operates. The capacitor 6C4 immediately begins recharging from both windings in series aiding and holds relay 6PR operated until the capacitor becomes charged. When relay 6PR releases, it opens the number one winding of relay 6HA, opens lead 6M and opens magnet 6PC. Magnet 6PC releases, steps its level A wipers to bank contact #1, closing a circuit to relay 6SP, and removes ground from contact 6PR8. Relay 6SP operates, closes the pulsing path of relay 6PR (opened by the off-normal contacts 6PC2 of switch PC), and prepares the pulsing paths of leads 6UHI and 6ULO. Relay 6PR will now pulse automatically as long as the ground appears on its contacts 6PR8, with a pulsing speed of approximately 7 or 8 PPS and a percent-make of approximately 50 percent.

The second pulse of 6PR grounds lead 6UHI and magnet 6PC and closes resistance battery to lead 5M. Magnet 6PC operates and after the pulse advances its level A wiper to bank contact #2. The resistance battery pulses on lead 5M step a switch in synchronism with switch 6PC in the outgoing trunk circuit Figs. 1 to 4. The switoh in the outgoing trunk circuit scans the calling party's number appearing in codel code on its banks and when a grounded codel lead is encountered, closes a ground via lead 5E to 6HA. This ground on lead 5E appears during the portion of the cycle when 6PR is restored. Relay 6HA operates and when 6PR next operates, it locks the number one winding of relay 6HA, and closes simultaneous grounds to leads 6ULO and 6UHI. After the pulse of 6PR, relay 6HA restores since the outgoing trunk opened lead 5E and the number two winding of relay 6HA when 6PR closed resistance battery to lead 5M.

If no ground appears on lead 5E, only 6PR pulses and closes the pulses over lead 6UHI for synchronization purposes. The simultaneous pulsing of 6PR and 6HA during the time when the level A wipers of switch 6PC scan bank terminals 2 through 5 closes ground to relay 6SM. When relay 6SM operates, it locks through its #1 winding, closes a new holding path to relay 6SP from switch 6PC, bank terminal 6, to bank terminal 31.

Relay 6PR pulses 32 times, and the sequence of operations is as follows:

TABLE OF 6PR PULSES AND 6PC POSITIONS

| After 6PR pulses | Digit | Pulse On Lead 6UHI | Switch PC |
|---|---|---|---|
| 1 | | | 1 |
| 2 | | 1 | 2 |
| 3–6 | 1st | 2–5 | 3–6 |
| 7–10 | 2nd | 6–9 | 7–10 |
| 11–15 | 3rd | 10–14 | 11–15 |
| 16–19 | 4th | 15–18 | 16–19 |
| 20–23 | 5th | 19–22 | 20–23 |
| 24–27 | 6th | 23–26 | 24–27 |
| 28–31 | 7th | 27–30 | 28–31 |
| 32 | | 31 | 32 |

Just previous to the 32nd pulse of 6PR, a ground pulse is closed to 5E if the outgoing trunk has registered a complete detection of the calling party's number. This 31st synchronized pulse closed to both leads 6ULO and 6UHI registers a complete detection indication in the ticketer.

Relay 6SP restores when 6PC steps to position 10 and removes ground from relay 6PR. Relay 6PR stops pulsing. Switch 6PC steps, self-interrupted, to normal from ground on the wiper engaged on bank terminal 32 through contacts 6PC1.

When the ticketer has completely received the calling party's number, it grounds lead 6UML. Two-step relay 5ML only operates its "X" contacts 5ML5 on its #2 winding (the number one winding of 5ML remains shorted by ground as long as ground remains on lead 6UML).

SWITCHING THROUGH

After sending is completed, the ticketer removes ground from lead 6UML, thus removing the short on the number one winding of 5ML. Relay 5ML operates fully on both its windings in series, locks, opens its operating path, closes battery through lamp 6L1 to lead 5M, removes the idle line termination, and closes leads 5R1 and 5T1 to repeat coil 5RC. The talking circuit is now closed through repeat coil 5RC to leads 6RU and 6TU.

RELEASE

When the calling party restores his handset, the outgoing trunk opens lead 5ES. Relay 5AA restores and opens the loop to the ticketer. When the ticketer removes ground from lead 6CU, the holding path of relays 5FA and 5FB is removed and they restore and open relays 6SM and 5ML. Relays 6SM and 5ML restore, opening lead 5M to mark this switch idle. The circuit is now at normal.

INCOMPLETE DETECTION

If an incomplete detection is registered in the outgoing trunk, no codel grounds will be reecived on lead 5E as relay 6PR pulses. As switch 6PC scans terminals 2 through 5, relay 6SM will not operate as in a normal call. As switch 6PC steps to bank terminal 6, relay 6SP restores and opens the pulsing circuit to relay 6PR. Relay 6PR stops pulsing. The ticketer recognizes that a full complement of pulses has not been received and closes ground to lead 6UML. Relay 5ML operates its "X" contacts and 5ML5 and shorts its #1 winding. After dialling is completed, the ticketer opens lead 6UML to cause this circuit to switch through as described in the section titled "Switching Through."

DOUBLE SEIZURE OF TICKETER

If the ticker hunter seizes a ticketer simultaneously with another ticketer hunter or selector, relay 5FA will be in multiple with another relay and will not operate over lead 6CU due to its marginal adjustment. Since absence-of-ground appears on lead 6HU, relay 5AG is not shorted and operates on its #2 winding in series with magnet 6M, closes ground to relay 5JT, closes ground to the #1 winding of relay 5FA and opens lead HU. Relay 5JT operates, closes ground to magnet 6M through the #1 winding of relay 5AG, locks, and opens the #1 and #2 windings of relay 5FA. Magnet 6M operates. The INT springs 6M2 operate and short the #1 winding of relay 5AG. Relay 5AG restores, opens the circuit to relay 5JT. Relay 5JT restores, closes lead 6HU to magnet 6M, closes the operating path of relay 5FA and opens magnet 6M. Magnet 6M restores and steps the rotary switch to the next ticketer. Hunting continues as before.

GROUND FAULT

If a ground fault condition is registered in the outgoing trunk, ground is closed to lead 5E after the first pulse of relay 6PR. Relay 6HA operates.

During the second pulse of 6PR, ground is simultaneously closed to leads 6ULO and 6UHI to indicate to the ticketer a "ground fault."

Also, ground is closed to relay 6SM through the switch 6PC, bank contact #1. Relay 6SM operates and opens relay 6SP. Relay 6SP restores, opening the ground to 6PR. Relay 6PR stops pulsing and releases.

The ticketer then closes ground over lead 6UML to relay 5ML. Two-step relay 5ML operates its "X" contacts 5ML5 only on its #2 winding. When the ticketer removes ground on lead 6UML, relay 5ML operates fully, locks and closes through the talking circuit as explained in the section titled "Switching Through."

PREMATURE DIALLING (*a*) Before a ticketer is found:

If the subscriber dials before an idle ticketer is found, relay 5BB is still operated, and relay 5AA follows the dial pulses and sends battery pulses through lamp 6L1 over lead "5M" to the outgoing trunk. The outgoing trunk provides the release of the incoming trunk circuit by opening lead 5ES.

(*b*) Before a transender is found:

If the subscriber dials before an indle transender is found, the ticketer closes a ground pulse to lead "6UML." Relay 5ML operates fully after the pulse and closes battery through lamp 6L1 to lead "5M" to the "outgoing trunk." The outgoing trunk provides the release of the incoming trunk circuit by opening lead 5ES.

PREMATURE RELEASE OR BATTERY FAILURE

If the subscriber releases before the completion of the dialling of the called number, relay 5AA restores and opens the loop to the ticketer which opens lead 6CU. Relays 5FA and 5FB restore. Relay 5FA shorts 6AR through contact 6PC2. Relay 6AR restores, open the circuit of relay 6SP, closes ground to INT springs 6PC1 and closes battery through lamp 6L1 to lead "5M." Magnet 6PC steps the rotary switch self-interrupted to position "Normal." In this position the contacts 6PC2 operate and remove the short from relay 6AR. Relay 6AR re-operates.

In case of failure of battery, relay 6AR also restores and closes battery to lead 5M to mark the incoming trunk busy.

SEIZURE FROM SECOND BRANCH EXCHANGE LOCAL SELECTOR

When the calling subscriber at station 15PS4 (whose directory terminal number is 0004) removes his receiver, the operation will be the same as that described for the subscriber 9PS4 in the First Branch Exchange in the section titled "Seizure From First Branch Exchange Local Selector." The designations of the apparatus in Fig. 15 is the same as that in Fig. 9 except for the figure designating portion. An example is the subscriber station PS4, in Fig. 9 it is designated 9PS4 while in Fig. 15 it is designated 15PS4.

SEIZURE OF TRUNK CIRCUIT

Battery potential through resistance 2R3 on lead 11C marks this circuit idle to preceding selectors. When seized, the "tip" side 11T of the subscriber's loop is closed through polar relay 12PA and its associated Lamp 12L to exchange battery, and the "ring" side 11R of the subscriber's loop is closed thru relay 13AA and resistor 13R1 to Spotter Battery. Relay 13AA operates, but relay 12PA does not operate at this time. Relay 13AA closes the number one winding of relay 14AB and 11BA. Relay 14AB operates, closes part of the pulsing circuit on lead 14RT, blocks digit "0" from being repeated to the incoming trunk circuit, and prepares a holding circuit to relay 11BA. Relay 11BA operates, connects a multiple ground to the number one winding of relay 14AB, prepares the circuit to relay 12CA, grounds lead HU which marks this circuit busy, closes a circuit to relay 12BB, and connects ground to lead 11C to hold the preceding equipment and mark this circuit busy. Relay 12BB operates, prepares the circuit to magnets 11PS and 11PC, closes 6 second ground pulses to magnet 12CT, prepares a circuit to relay 13PR via lead 14SS and closes ground to lead RT.

DIALLING PARTY IDENTIFICATION DIGIT "0"

This operation is identical to that described in the preceding section with a like title.

IDENTIFICATION OF CALLING PARTY

This operation is identical to that described in the preceding section with a like title.

INITIATING DETECTION CYCLE

This operation is identical to that described in the preceding section with a like title.

DIALLING CALLED NUMBER

Ground on lead 14RT seizes the intermediate incoming trunk circuit. The line loop to relay 14AB was closed as explained in section titled "Dialling Party Identification Digit 0." The subscriber dials digit "A" of the office code and relay 14AB follows these pulses. When 14AB restores on the first pulse, a circuit is closed to 12CA. Relay 12CA operates, removes ground from the wipers level A of switch 11PC, and closes 12CB. Relay 12CA remains operated during pulsing of digit "A" due to its slow-to-release characteristics. Relay 12CB operates and prepares a circuit to magnet 11PC. After digit "A" has been dialled, relay 14AB restores and opens the circuit to relay 12CA. Relay 12CA restores, opens 12CB, and closes a circuit to magnet 11PC via the level A wipers of switch 11PC, bank contact #10 and the INT springs 11PC4 of 11PC. The INT springs 11PC4 operate and open magnet 11PC. Switch 11PC advances its level A wipers one step to bank contact "N." Relay 12CB restores.

A circuit is now closed via the wipers level A of switch 11PC, bank contact "N" and the RSON springs 11PS4 of switch 11PS to the number one winding of relay 12KS. Relay 12KS operates, locks, opens the "homing" circuit of switch 11PS, closes ground to magnet 11PS via the RSON 11PS1 and INT springs 11PS3 of switch 11PS, prepares a circuit to the number one winding of relay 13FM and 13SR, and closes 12HA. The INT springs 11PS3 of switch 11PS operate and switch 11PS advances its wipers to bank contact #1. Relay 12HA operates and closes ground on lead 14TT to the intermediate incoming trunk of the carrier equipment. This signals the carrier equipment that the calling party's number is ready to be sent. The carrier equipment immediately returns a pulsing ground on lead 14SS to control the sending of the calling party's number as explained in section titled "Transferring Calling Party's Number to the Ticketer."

Relay 14AB follows the dial pulses of each digit of the ecalled number including digit "A" of the office code. These digits are repeated to the intermediate incoming trunk circuit as ground pulses on lead 14RT.

TRANSFERRING CALLING PARTY'S NUMBER TO THE TICKETER

The calling party's number, detected by the detector, stored on the codels, is transferred to the intermediate incoming trunk in the following manner. Relay 13PR follows the ground pulses on lead 14SS as explained in the preceding section.

On the first pulse, relay 13PR operates, closes a circuit to the number one winding of relay 13FM and to relay 13SR, and opens 12HA. Relay 12HA restores and opens lead 14TT. Relay 13FM operates and shorts the number one winding of relay 13FB. Relay 13SR operates and prepares its own holding circuit and a pulsing circuit to magnet 11PC. After the first pulse, relay 13PR restores, and opens the number one winding of relay 13FM, opens 13SR, and removes the short from the number one winding of relay 13FB. Relay 13FB operates and closes its "X" contacts 13FB10 which complete a circuit to the number two winding of relay 13FB. Relay 13FB operates fully, prepares a circuit to relay 13EP, opens the circuit to winding number one of relay 13FM, and transfers the operating circuit of relay 12HA to the wipers of switches 11PC and 11PS. Relay 13FM restores.

On the second pulse, relay 13PR reoperates, recloses 13SR, and energizes magnet 11PC via its RSON contacts 11PC3. After the second pulse, relay 13PR restores, opens 13SR, and opens magnet 11PC. Switch 11PC steps the wipers of level B to bank contact #1. Relay 13SR will remain operated during pulsing due to its slow-to-release characteristics.

After relay 13PR has restored after each pulse and if a grounded code lead is encountered (W1 to Z7), a circuit is closed to 12HA. Relay 12HA operates, closes ground to lead 14TT, closes a circuit to the number one winding of relay 13FM, and closes a holding circuit to magnet 11PC or magnet 11PS. Switch 11PC (or 11PS) is prevented from stepping until relay 13PR reoperates on the next pulse. Relay 13FM operates and is held on its #2 winding when relay 13PR reoperates. Relay 13PR reoperates, opens 12HA, opens magnet 11PC (or 11PS), and closes a circuit to the number two winding of relay 13FM. Switch 11PC (or 11PS) step to the next bank contact. Relay 12HA restores, opens the holding circuit for magnet 11PC (or 11PS), and opens the circuit to the number one winding of relay 13FM. Relay 13PR restores, closes 12HA, and opens the circuit to the number two winding of relay 13FM.

If the succeeding code lead is grounded, relay 12HA reoperates and operates as described above.

If the succeeding code lead is not grounded, relay 12HA does not reoperate and relay 13FM restores and switches 11PC (or 11PS) may continue scanning as described above.

The wipers of level B, switch 11PC will scan code leads 11W1 to 11X3, and then the wipers of level C, switch 11PC will scan code leads 11Y3 to 11Z5. When the wipers of level C arrive at bank contact "N," the RSON springs of switch 11PC restore and transfer the pulsing circuit to magnet 11PS. The wipers of level C, switch 11PS scan code leads 11W6 to 11Z7.

A circuit is closed to relay 12HA via the contacts 14KC5 of relay 14KC and bank contact #9, level C of switch 11PS. Relay 12HA operates, closes magnet 11PS, and marks lead 14TT. A ground pulse is closed on lead 14SS to operate relay 13PR. Relay 13PR operates, opens 12HA, and opens magnet 11PS. Relay 12HA restores. Switch 11PS steps to bank contact #10. After the last pulse on lead 14SS, a relay 13PR restores.

When the wipers of level A, switch 11PS arrive at bank contact #10, a circuit is closed to relay 13EP. Relay 13EP operates and prepares a circuit to 14EN. Relay 13SR restores and opens the pulsing circuit to 11PS.

SWITCH-THROUGH

When the carrier equipment has received the dialled number and the calling party's number and all necessary routing digits have been sent from the main ticketing office or, in case of "no detection," connection has been made to a BD operator, ground is closed on lead 14SS. Relay 13PR operates and closes 14EN. Relay 14EN operates, locks to relay 12BB through its "X" contacts 14EN6, closes the transmission circuit, opens the holding circuits to 14PB, 13PR, 14KC, 12KS, and the Codels, opens the pulsing circuit to magnet 13CT, and closes 12CO. Relay 12CO operates, closes multiple ground on lead HU. Relays 14PB, 13PR, 14KC, 12KS, and the codels restore.

PREMATURE DIALLING

If the subscriber dials the first digit of the called number before idle carrier equipment is encountered or before a ticketer or transender has been seized, ground pulses are returned on lead 14SS to pulse relay 13PR. Relay 12KS has not operated yet. During the first pulse, relay 13PR operates and closes a circuit to 14HC. Relay 14HC operates, locks to 12BB, closes 13HD, opens lead 14RT and closes busy tone to lead 11R. Relay 13HD operates as explained in the section on dialling party identification digit.

Subsequent operations are as explained in the section titled "Release From a Completed Call" with the following exceptions: Relay 14HC and 14PB restores after 12BB restores. Relay 14EN is not operated at this time.

INCOMPLETE DETECTION

If an incomplete or double detection occurs in the detector, ground is closed to lead 11INC. Relay 14KE operates, opens 14KA, and opens the wipers of levels B and C, switch 11PC. Relay 14KA restores, opens 14KB, removes ground from lead Start and closes ground to lead Guard. Relay 14KB restores, opens bar relay 11BR, and opens 11KD. Bar relay 11BR restores. Relay 11KD restores and replaces +80 v. D.C. detector battery with ground on lead 11C.

The first digit of the called number is dialled. Switch 11PC steps the wipers of Level A to bank contact "N" and closes a circuit to the number one winding of relay 12KS. Relay 12KS operates and closes 12HA. Relay 12HA operates and closes ground to lead 14RT which seizes the intermediate incoming trunk circuit. A pulsing ground is returned on lead 14SS to pulse relay 13PR. During the first pulse, relays 13FB, 13FM, and 13SR operate as explained in the section titled "Transferring Calling Party's Number to the Ticketer." When 13FB operates, a circuit is closed to relay 13EP. Relay 13EP operates. Succeeding pulses into 13PR cause switch 11PC to start scanning the codels. Since relay 14KE has already operated and opened the level B and C wipers of switch 11PC, no codel mark will be repeated to the incoming trunk circuit via lead 14M.

Since no ground has been repeated to the incoming trunk while scanning the first four bank contacts, it stops closing pulses to 13PR. Relay 13PR restores and opens 13SR. Relay 13SR restores. When dialling has been completed, ground is again closed to lead 14SS to operate 13PR. Relay 13PR operates and closes 14EN. Relay 14EN operates and "switches through" as explained in the section titled "Switch Through" with the following exceptions: Relays 14KC and 12KS are not operated and relay 14KE is operated.

Subsequent operations are as explained in the section titled "Release From a Completed Call" with the following exceptions: Relay 14KE restores after relay 12BB restores.

GROUND FAULT ON LINE

If there is a low-resistance ground leak on either the "tip" or "ring" side of the calling line, relay 12PA will operate either as the circuit is seized or as the first dial pulse is received. Relay 12PA operates and closes a circuit to the number one winding of relay 13GT. Relay 13GT operates and locks through its "X" contacts 13GT5 to 12BB, prepares to close 12HA and 13EP.

The first digit of the called number is dialled. Switch 11PC steps the wipers of level A to bank contact "N" and closes a circuit to winding number one of relay 12KS. Relay 12KS operates and closes a circuit to relay 12HA. Relay 12HA operates and closes ground to lead 14RT which seizes the intermediate incoming trunk circuit. A pulsing ground is returned on lead 14SS to pulse relay 13PR. During the first pulse, relays 13FB, 13FM and 13SR operate as explained in the section titled "Transferring Calling Party's Number to the Ticketer."

When relay 13FB operates after the first pulse, a circuit is closed to 13EP and 12HA. Relay 13EP operates and prepares a circuit to 14EN. Relay 12HA operates and closes ground on lead 14TT. This mark on lead 14TT is an additional pulse to the incoming trunk befor switch 11PC steps. This additional pulse is the ground fault indication. Lead 14SS is opened. Relay 13SR restores. When dialling has been completed, ground is again closed to lead 14SS to operate 13PR. Relay 13PR operates and closes 14EN. Relay 14EN operates and "switches-through" as explained in the section titled "Switch Through" with the following exception: Relay 13GT is operated. The ticketer will either route the call to an operator or close busy tone to the subscriber.

Subsequent operations are as explained in the section titled "Release From a Completed Call" with the following exceptions: Relay 13GT restores after relay 12BB restores.

FAILURE TO DIAL PARTY IDENTIFICATION DIGIT "0"

In order for relay 13HD to operate upon completion of the first digit, it is necessary that the wipers of level A, switch 11PC, be engaged on bank contact #10. Should the subscriber fail to dial the party identification digit "0," relay 13HD will not operate.

If any digit other than "0" is dialled, relay 12CA restores after the last pulse and closes 14HC via bank contacts #1 to #9, level A of switch 11PC. Relay 14HC operates, locks to relay 12BB, closes 13HD, opens lead 14RT, and closes busy tone to lead 11R. Subsequent operations are as explained in the section titled "Premature Dialling."

TIME-OUT FEATURE

If the calling party has not dialled the party identification digit "0" within 18 seconds from seizure of this switch, ground appearing on bank terminal 3 of switch 12CT is closed to 14HC via the multipled level A bank terminals 1 to 9 of switch 11PC. Relay 14HC operates, locks, removes ground from lead 14RT, closes 13HD and closes busy tone to lead 11R. Relay 13HD operates, locks to ground at 12BB, and transfers leads 11R and 11T from relays 13AA and 12PA to relay 14AB. Relay 13AA restores.

If no detection indication (Complete, Incomplete or Ground Fault) has been received or the calling party has not dialled the first digit of the called number within 30 seconds from seizure, ground appearing on bank terminal 5 of switch 12CT is closed to 14HC. Relay 14HC operates, locks, closes busy tone to lead 11R and removes ground from lead 14RT. (If relays 14KA and 14KB and bar relay 11BR are still operated, they will restore at this time.)

If switch-through has not occurred within 48 seconds after seizure, relay 14HC operates, locks, removes ground from lead 14RT, and closes busy tone to lead 11R.

*Release*

RELEASE FROM A COMPLETED CALL

When the calling party disconnects, the loop to 14AB is opened. Relay 14AB restores, opens lead 11R, opens 11BA, and closes 12CA. Relay 12CA operates and closes 12CB. Relay 12CB operates and prepares the delayed alarm circuit. Relay 11BA restores, releases 12BB, and opens 12CA. Relay 12BB restores, opens 13HD, 13EP, 13FB, and 14EN, and closes the number one winding of relay 12CB to magnets 12CT and 11PS. Switches 11PS and 12CT step self-interrupted to normal. When 12CT is normal, its RSON springs open and transfer the "homing" circuit to magnet 11PC. Switch 11PC steps self-interrupted to normal. When at normal, its RSON springs open and release 12CB. Relay 12CB restores. Relay 13EP restores. Relay 13FB restores. Relay 14EN restores, opens the transmission circuit and relay 12CO. Relay 12CO Restores and removes ground from lead HU which marked this circuit busy. Relay 13HD restores, transfers lead 11R from the number one winding of relay 14AB via the repeat coil 14RC to relay 13AA, and transfers lead 11T from the number two winding of relay 14AB via the repeat coil 14RC to relay 12PA. Relay 12CA restores. The associated incoming trunk removes ground from lead 14SS. The circuit is now at normal.

RELEASE FROM TIMED-OUT CONDITION

This operation is identical to that described in the preceding section with a like title.

ASSOCIATED INCOMING TRUNK BUSY

When the associated incoming trunk of Figs. 5 and 6 is taken out-of-service, ground is closed via lead 14SS to relay 12RB. Relay 12RB operates, grounds lead 14HU which marks this circuit busy to the intermediate incoming trunk circuits, and grounds lead 11C which marks this circuit busy to the preceding selectors. Relay 12RB restores when the associated incoming trunk is returned into service and opens lead 14HU and 11C. The circuit is at normal.

SEIZURE OF INTERMEDIATE TRUNK ADAPTER CIRCUIT

This circuit is marked idle to an outgoing trunk circuit by absence-of-ground on lead 7SS. Upon seizure, a circuit is closed via lead 7RT to the number one winding of relay 7AA. Relay 7AA operates and closes a circuit to 8BB. Relay 8BB operates, closes ground on lead HU to lead M2, and shunts the number two winding of relay 8AG. Magnet 8M is energized from ground on the wipers of level A (normal position), opens its INT springs 8M1 and restores, advancing its wipers to the first bank terminal. Busy carrier or radio equipment is marked by ground on leads 8CU and 8HU of the associated outgoing trunk circuit. Ground on the 8HU leads causes switch 8M to continue stepping self-interrupted, until idle carrier or radio equipment is encountered. Idle carrier or radio equipment is marked by absence-of-ground on the 8HU lead and resistance battery on the 4CU lead of the associated outgoing trunk circuit. When the idle carrier equipment is encountered, absence-of-ground on lead 8HU removes the shunt from the number two winding of relay 8AG, and prevents switch 8M from advancing to the next bank contact. Relay 8AG operates in series with magnet 8M (magnet 8M does not operate at this time), closes ground through the number one winding of relay 8FA to lead 8CU and then closes a circuit to relay 7JT. Resistance battery encountered on lead 8CU causes relay 8FA to operate its "X" contacts 8FA6, preventing slower relay 7JT from operating and closing a circuit to the number two winding of relay 8FA and relay 8FB in series.

Relay 8FA operates fully, prepares its holding circuit to lead 8CU, closes resistance battery through lamp 7L1 to lead 8MS, closes relay 8HA to lead 8TT, and closes the line termination between leads 8R and 8T.

Relay 8FB operates, closes a circuit to relay 7PR through resistance 7R1 to lead 8E, prepares a holding circuit for relays 7SD and 7EN, opens the circuit of relay 8BB, and grounds lead 8CO to busy the associated outgoing trunk circuit which then closes ground to lead 4CU to hold relays 8FA and 8FB operated.

Relay 8BB restores, opens lead 8SS from the pulsing springs of relay 7AA, and opens the circuit to the number two winding of relay 8AG. Relay 8AG restores.

Resistance battery through lamp 7L1 on lead 8MS seizes idle carrier equipment. When the subscriber dials digit "A" of the office code, ground is closed to 8HA via lead 7TT. Relay 8HA operates and closes resistance battery through lamp 8L2 on lead 8M. The carrier equipment upon receiving this signal returns a pulsing ground on lead 8E. On the first pulse, relay 7PR operates, closes a circuit to relay 7SR, and grounds lead 7SS which controls the pulsing operation of the outgoing trunk circuit in the second exchange and opens lead 7TT. Relay 7SR operates on the first pulse and remains operated during pulsing due to its slow-to-release characteristics. Relay 7SR closes a circuit to relay 7SD. Relay 7SD operates, closes its "X" contacts 7SD1 first and locks to relay 8BB. Relay 8HA restores and opens lead 8M. Relay 7PR follows the pulses on lead 8E and repeats ground pulses on lead 7SS. The circuit is now prepared to receive pulses via leads 7RT and 7TT.

PULSING

Both leads 7RT and 7TT are used for forwarding information to this circuit. The subscriber's dial pulses are repeated to this circuit on lead 7RT. The calling party's number is forwarded to this circuit via lead 7TT.

FORWARDING THE SUBSCRIBER'S DIAL PULSES

Relay 7AA follows the pulses on lead 7RT from the outgoing trunk circuit. Relay 7AA alternately opens and closes battery on lead 8MS. The carrier equipment responds to these pulses and transmits carrier pulses to the distant exchange.

FORWARDING THE CALLING PARTY'S NUMBER

Relay 8HA follows the pulses sent via lead 7TT from the outgoing trunk circuit. Relay 8HA alternately opens and closes battery on lead 8M. The carrier equipment responds to these pulses and transmits carrier pulses to the distant exchange.

When the calling party's number has been completely received in the distant office, lead 8E is opened.

Relay 7PR restores, opens lead 7SS, and opens the circuit to relay 7SR. Relay 7SR restores and prepares a circuit to the number one winding of relay 7EN.

SWITCH-THROUGH

After the carrier equipment has completed sending the dialled number and the calling party's number, ground is closed on lead 8E. Relay 7PR reoperates, grounds lead 7SS, and closes a circuit to the number one winding of relay 7EN. Relay 7EN operates, locks to relay 8BB, closes a line loop for transmission via leads 7RT and 7TT to the number one and number two windings of relay 7AA, opens the line termination across leads 8R and 8T, opens the circuit to relay 8HA, and "switches-through" a transmission circuit.

RELEASE

When the calling party disconnects, the loop to relay 7AA is opened. Relay 7AA restores, removes ground from lead 8CO and removes resistance battery through lamp 7L1 from lead 8MS which releases the carrier equipment. The outgoing trunk circuit removes ground from lead 4CU and closes resistance battery to lead 4CU. Relays 8FA and 8FB restore. When relay 8FB restores, resistance battery 7R1 through relay 7PR is disconnected from lead 8E, and opens the circuit to relay 7SD and the number two winding of relay 7EN. Relays 7PR, 7SD, and 7EN restore. Rotary switch 8M remains on the "last used" bank contact in preparation for the next call.

DOUBLE SEIZURE OF IDLE CARRIER OR RADIO EQUIPMENT

When two intermediate incoming trunk circuits simultaneously seize the same idle carrier equipment, each intermediate incoming trunk will encounter resistance battery from the associated outgoing trunk on lead 8CU. However, since relays 8FA of each intermediate incoming trunk are connected to resistance battery simultaneously and are in parallel, relay 8FA will not operate due to its marginal adjustment. Relay 7JT operates, opens the circuit to the number one winding of relay 8FA and lead 8CU, grounds magnet 8M via the number one winding of relay 8AG and lead M1. Magnet 8M operates, operates its INT springs 8M1, which open the number two winding of relay 8AG and short the number one winding of relay 8AG via lead M3, INT springs 8M2, and lead M1. Relay 8AG restores and opens the circuit to relay 7JT. Relay 7JT restores and opens the circuit to magnet 8M. Rotary switch 8M advances its wipers one step.

Rotary switch 8M will continue to step self-interrupted until idle carrier equipment is encountered.

While one embodiment of the invention has been disclosed, it will be understood that various modifications may be made therein which are within the true spirit and scope of the invention.

What is claimed is:

1. In an automatic telephone system, a first exchange, a toll ticketing repeater arranged to process toll calls from a branch exchange and from its own exchange, a toll incoming trunk circuit, said incoming trunk having access to said toll ticketing repeater, a branch exchange, a repeater in said branch exchange, said repeater paired with said toll incoming trunk in said first exchange, carrier equipment in each exchange, said carrier equipment having first, second and third carrier channels interconnecting said repeater in said branch exchange and said incoming trunk in said first exchange, said repeater in said branch exchange having means for accepting loop impulses from a subscriber and sending these pulses via said first channel of said carrier, a calling station directory number detector in said branch exchange, said detector causing said repeater to record said calling subscriber directory number within itself, said repeater forwarding said calling station identity to said first exchange as a series of impulses via said second carrier channel in synchronism with impulses received from the incoming trunk via said third channel of said carrier equipment.

2. In an automatic telephone system, a first exchange, a toll ticketing repeater arranged to process toll calls from branch exchanges and from its own exchange, a toll incoming trunk circuit, said incoming trunk circuit having access to said toll ticketing repeater, a branch exchange, a repeater in said branch exchange, said repeater paired with said toll incoming trunk in said first exchange, carrier equipment in each exchange, said carrier equipment having a first, second and third signalling channel, said carrier equipment inter-connecting said repeater in said branch exchange and said incoming trunk in said first exchange, a calling station directory number detector in said branch exchange, means in said repeater in said branch exchange to receive and register said directory number from said detector, said repeater in said branch exchange having means for accepting loop impulses from a subscriber and forwarding these pulses to said incoming trunk via said first channel of said carrier, said incoming trunk in said first exchange upon receipt of said called line impulses sending a periodical impulse via said second channel to said repeater in said branch exchange, said repeater in said branch exchange in response to these impulses forwarding the calling station identity pulse by pulse in time with said received pulses via said third channel of said carrier, said incoming trunk in said first exchange causing a signal to be sent to said branch exchange via said third channel, if a ticketer is not available when the first called station directory number impulse is received.

3. In an automatic telephone system, a first exchange, a toll ticketing repeater arranged to process toll calls from branch exchanges and from its own exchange, a toll incoming trunk circuit, said incoming trunk circuit having access to said toll ticketing repeater, a branch exchange, a repeater in said branch exchange, said repeater paired with said toll incoming trunk in said first exchange, carrier equipment in each exchange, said carrier equipment having a first, second and third signalling channel, said carrier equipment inter-connecting said repeater in said branch exchange and said incoming trunk in said first exchange, a calling station directory number detector in said branch exchange, means in said repeater in said branch exchange to receive and register said directory number from said detector, said repeater in said branch exchange having means for accepting loop impulses from a subscriber and forwarding these pulses to said incoming trunk via said first channel of said carrier, said incoming trunk in said first exchange upon receipt of said called line impulses sending a periodical impulse via said second channel to said repeater in said branch exchange, said repeater in said branch exchange in response to these impulses forwarding the calling station identity pulse by pulse in time with said received pulses via said third channel of said carrier, means in said incoming trunk in said first exchange for causing a signal to be sent to said branch exchange via said third channel if the calling station number is not complete, said branch exchange repeater having means responsive to said third channel signal for releasing said trunk equipment.

4. In an automatic telephone system, a first exchange, a toll ticketing repeater arranged to process toll calls from branch exchanges and from its own exchange, a toll incoming trunk circuit, said incoming trunk circuit having access to said toll ticketing repeater, a branch exchange, a repeater in said branch exchange, said repeater paired with said toll incoming trunk in said first exchange, carrier equipment in each exchange, said carrier equipment having a first, second and third signalling channel, said carrier equipment inter-connecting said repeater in said branch exchange and said incoming trunk in said first exchange, a calling station directory number detector in said branch exchange, means in said repeater in said branch exchange to receive and register said directory number from said detector, said repeater in said branch exchange having means for accepting loop impulses from a subscriber and forwarding these pulses to said incoming trunk via said first channel of said carrier, said incoming trunk in said first exchange upon receipt of said called line impulses sending a periodical impulse via said second channel to said repeater in said branch exchange, said repeater in said branch exchange in response to these impulses forwarding the calling station identity pulse by pulse in time with said received pulses via said third channel of said carrier, means in said incoming trunk in said first exchange for causing a signal to be sent to said branch exchange via said third channel if a ticketer is not available when the first called station directory number impulse is received, and said means also effective to release said trunk equipment when an initiated call does not forward the complete station identity of the calling station.

5. In an automatic toll ticketing telephone system, a first exchange including a toll ticketing repeater arranged to process the toll calls from a branch exchange and from its own exchange, said repeater initiating the detection of the station identity of a calling subscriber in its own exchange when a toll call is originated therefrom and processing said call to cause a record of pertinent data relative to said call to be made, a second exchange including a simplified toll repeater and apparatus for detecting the calling subscriber's directory number, carrier communication equipment for interconnecting said second exchange and said first exchange, said carrier equipment comprising a first, a second and a third communication channel, means in said repeater of said second exchange for forwarding the called station directory number to said first exchange toll ticketing repeater over said first carrier channel and a second means for forwarding said calling station directory number to said first exchange over said second channel and including means in said repeater of said second exchange for synchronizing the sending of said calling station identity in response to pulses from said first exchange repeater over said third channel of said carrier equipment.

6. In a telephone system having at least a first and a second exchange, each exchange having a plurality of subscriber lines associated therewith and a plurality of links for setting up connections between said subscriber lines, trunk means at each exchange accessible to said links of said second exchange for extending connections from the subscriber lines in said second exchange to said first exchange; carrier means for connecting each of the trunks of said second exchange with a corresponding paired trunk at said first exchange, impulsing means for each subscriber for transmitting impulses representative of the called number to said trunks in the establishment of a call thereover, recorder means at said first exchange for recording for subsequent billing purposes the directory number of the calling line as forwarded over a carrier channel, and further information for each call established over the trunk, impulsing means in each trunk for transmitting the information so received to said recorder means, synchronizing signal means for transmitting a signal over said connection, said calling party identity sending means operative only with receipt of said signal at a predetermined time for enabling said first trunk circuit to extend the coded identity to the first exchange, 7. A trunk repeating circuit for use in extending connections between subscribers of a first inter-connecting exchange to a second toll ticketing exchange, the subscribers of the first exchange having access to said trunk means over associated link switching equipment, and in which ticketing information including calling party number is transmitted over the trunk to the toll ticketing exchange; said trunk means comprising a first trunk circuit in said first exchange, a second trunk circuit and carrier equipment comprising a first, a second and a third transmission channel in said second exchange to which said links of the local exchange have access for the purpose of establishing an outgoing call thereover, impulse repeating means at said first exchange for transmitting the impulses representing the called party number as a series of pulses over said first channel of said carrier, as received, simultaneously to said calling party identity being forwarded as a series of pulses over said second channel of said carrier, means at said second exchange for causing said trunk circuit to employ said third channel of said carrier to forward a series of pulses to said trunk circuit in said first exchange for synchronizing said sending means of said first trunk circuit with said recording means at said second trunk circuit, said third channel of said carrier also effective to transmit supervisory signals to said first trunk circuit upon establishment of a call over said trunk repeating circuit.

8. In a telephone system having at least a first and second exchange, each exchange having a plurality of subscriber lines associated therewith and a plurality of links for setting up connections between subscriber lines, a toll ticketing repeater in said first exchange, trunk means at each exchange accessible to said links at said second exchange for extending connections from the subscribers line in said second exchange to said first exchange toll ticketing repeater; carrier means for connecting each of the trunks of said second exchange with a corresponding paired trunk at said first exchange, said carrier means including a synchronizing channel, calling line station detecting means at said second exchange, said detecting means in response to a call to said trunk at said second exchange detecting said calling party's station identity and registering said identity in said trunk, impulsing means for each subscriber for transmitting impulses representative of the called number to said trunks in the establishment of a call thereover, said trunk circuit in said second exchange having means for transforming said loop impulse from said subscriber into a series of battery potential pulses to said carrier unit, said trunk circuit at said first exchange in response to seizure of said toll ticketing repeater in said first exchange causing via said synchronizing channel said carrier unit in said second exchange to forward a series of pulses to said trunk circuit in said second exchange, said trunk circuit in said second exchange in response to these pulses causing said calling station identity code to be forwarded pulse by pulse in synchronism with said pulses from said carrier unit as a series of battery potential pulses to another keying unit of said carrier units, said synchronizing channel from said first exchange to said second exchange effective to signal said trunk unit in said second exchange of the indication of switching through to the called subscriber.

9. In an automatic toll ticketing telephone system, a first exchange, a tandem exchange, and a branch exchange, a toll ticketing repeater in said first exchange arranged to process toll calls from its own and other exchanges, a toll incoming trunk circuit in said first exchange, said incoming trunk circuit having access to said toll ticketing repeater, a repeater in said tandem exchange, said repeater in said tandem exchange paired with said toll incoming trunk in said first exchange, carrier equipment in said first and said tandem exchange, said carrier equipment arranged to provide a speech channel in each direction and a first, second and third unidirectional signal channel, said carrier equipment inter-connecting said repeater in said tandem exchange and said incoming trunk in said first exchange, a calling station directory number detector in said tandem exchange, means in said repeater of said tandem exchange for registering said directory number from said detector, said repeater in said tandem exchange having means for accepting loop impulses from a subscriber and forwarding these pulses to said incoming trunk via said first channel of said carrier, said incoming trunk in said first exchange upon receipt of said called line impulses having means for sending a periodical impulse via said second channel to said repeater in said tandem exchange, means in said repeater in said tandem exchange in response to these impulses forwarding the calling station identity pulse by pulse in time with said received pulses via said third channel of said carrier, an intermediate repeater in said tandem exchange, said intermediate repeater having access to the same carrier equipment as said repeater, a repeater in said branch exchange, said repeater in said branch exchange paired with said repeater in said tandem exchange, a calling station directory number detector in said branch exchange, means in said branch exchange repeater for registering said directory number from said detector, said branch exchange repeater having means for accepting loop impulses from a subscriber and forwarding these pulses to said intermediate repeater, means in said intermediate repeater forwarding these pulses to said incoming trunk via said first channel of said carrier, said incoming trunk in said first exchange upon receipt of said called line impulses sending a periodical impulse via said second channel to said intermediate repeater, means in said intermediate repeater responsve to said pulses from said second channel to repeat them to said branch exchange repeater, said repeater in said branch exchange having means responsive to said impulses to forward the calling station identity pulses in time with said received pulses via one of the loop conductors to said intermediate repeater, means in said intermediate repeater to forward these station identity pulses via said third carrier channel to said incoming trunk.

10. In an automatic toll ticketing telephone system, a first exchange, a tandem exchange, and a branch exchange, a toll ticketing repeater in said first exchange arranged to process toll calls from its own and other exchanges, a toll incoming trunk circuit in said first exchange, said incoming trunk circuit having access to said toll ticketing repeater, a repeater in said tandem exchange, said repeater in said tandem exchange paired with said toll incoming trunk in said first exchange, carrier equipment in said first and said tandem exchange, said carrier equipment arranged to provide a speech channel in each direction and a first, second and third unidirectional signal channel, said carrier equipment inter-connecting said repeater in said tandem exchange and said incoming trunk in said first exchange, a calling station directory number detector in said tandem exchange, means in said repeater of said tandem exchange for registering said directory number from said detector, said repeater in said tandem exchange having means for accepting loop impulses from a subscriber and forwarding these pulses to said incoming trunk via said first channel of said carrier, said incoming trunk in said first exchange upon receipt of said called line impulses sending a periodical impulse via said second channel to said repeater in said tandem exchange, said repeater in said tandem exchange in response to these impulses forwarding the calling station identity pulse by pulse in time with said received pulses via said third channel of said carrier, an intermediate repeater in said tandem exchange, said intermediate repeater having access to the same carrier equipment as said repeater, a repeater in said branch exchange, said repeater in said branch exchange paired with said intermediate repeater in said tandem exchange, a calling station directory number detector in said branch exchange, means in said branch exchange repeater for registering said directory number from said detector, said branch exchange repeater having means for accepting loop impulses from a subscriber and forwarding these pulses to said intermediate repeater, means in said intermediate repeater forwarding these pulses to said incoming trunk via said first channel of said carrier, said incoming trunk in said first exchange upon receipt of said called line impulses sending a periodical impulse via said second channel to said intermediate repeater, means in said intermediate repeater responsive to said pulses from said second channel to repeat them to said branch exchange repeater, said repeater in said branch exchange having means responsive to said impulses to forward the calling station identity pulse in time with said received pulses via one of the loop conductors to said intermediate repeater, means in said intermediate repeater to forward these station identity pulses via said third carrier channel to said incoming trunk, means in said intermediate repeater in said tandem exchange to mark said repeater in said tandem exchange busy, when a call is in progress via said common carrier equipment.

11. In an automatic toll ticketing telephone system, a first exchange, a tandem exchange, and a branch exchange, a toll ticketing repeater in said first exchange arranged to process toll calls from its own and other exchanges, a toll incoming trunk circuit in said first exchange, said incoming trunk circuit having access to said toll ticketing repeater, a repeater in said tandem exchange, said repeater in said tandem exchange paired with said toll incoming trunk in said first exchange, carrier equipment in said first and said tandem exchange, said carrier equipment arranged to provide a speech channel in each direction and a first, second and third unidirectional signal channel, said carrier equipment inter-connecting said repeater in said tandem exchange and said incoming trunk in said first exchange, a calling station directory number detector in said tandem exchange, means in said repeater of said tandem exchange for registering said directory number from said detector, said repeater in said tandem exchange having means for accepting loop impulses from a subscriber and forwarding these pulses to said incoming trunk via said first channel of said carrier, said incoming trunk in said first exchange upon receipt of said called line impulses sending a periodical impulse via said second channel to said repeater in said tandem exchange, said repeater in said tandem exchange in response to these impulses forwarding the calling station identity pulse by pulse in time with said received pulses via said third channel of said carrier, an intermediate repeater in said tandem exchange, said intermediate repeater having access to the same carrier equipment as said repeater, a repeater in said branch exchange, said repeater in said branch exchange paired with said intermediate repeater in said tandem exchange, a calling station directory number detector in said branch exchange, means in said branch exchange repeater for registering said directory number from said detector, said branch exchange repeater having means for accepting loop impulses from a subscriber and forwarding these pulses to said intermediate repeater, means in said intermediate repeater forwarding these pulses to said incoming trunk via said first channel of said carrier, said incoming trunk in said first exchange upon receipt of said called line impulses sending a periodical impulse via said second channel to said intermediate repeater, means in said intermediate repeater responsive to said pulses from said second channel to repeat them to said branch exchange repeater, said repeater in said branch exchange having means responsive to said impulses to forward the calling station identity pulse in time with said received pulses via one of the loop conductors to said intermediate repeater, means in said intermediate repeater to forward these station identity pulses via said third carrier channel to said incoming trunk, means in said incoming repeater of said first exchange for sending a switch-through signal via said third carrier signal channel to said intermediate repeater upon extending the call, said intermediate repeater having means to extend said switch through indication to said branch exchange repeater via a signal lead.

12. In an automatic toll ticketing telephone system, a first exchange including a toll ticketing repeater arranged to process the toll calls from its own exchange, and an incoming trunk circuit for accepting calls from a branch exchange to said ticketing repeaters, said repeater initiating the detection of the station identity of a calling subscriber in its own exchange when a toll call is originated therefrom and to process said call to cause a record of pertinent data relative to said call to be made, a second exchange including a simplified toll repeater and apparatus for detecting the calling subscriber's directory number, radio carrier link equipment including a first, a second and a third channel in each exchange, said second exchange repeater and said first exchange incoming trunk inter-connected by means of said radio carrier link, means in said repeater of said second exchange for forwarding the called station directory number as a series of impulses to said first exchange incoming trunk and toll ticketing repeater over said first carrier channel and a second means for forwarding said calling station directory number as groups of coded pulses to said first exchange over said second channel and including means in said repeater of said second exchange for synchronizing the sending of said calling station identity with the calling station directory number storage means in the first exchange in response to pulses from said third channel of said carrier equipment from said first exchange trunk circuit.

References Cited in the file of this patent

UNITED STATES PATENTS

| | | |
|---|---|---|
| 2,535,510 | Ostline | Dec. 26, 1950 |
| 2,603,717 | Molnar | July 15, 1952 |